(12) United States Patent
Boillot

(10) Patent No.: US 7,961,173 B2
(45) Date of Patent: Jun. 14, 2011

(54) METHOD AND APPARATUS FOR TOUCHLESS CALIBRATION

(75) Inventor: Marc Boillot, Plantation, FL (US)

(73) Assignee: NaviSense, Plantation, FL (US)

(*) Notice: Subject to any disclaimer, the term of this patent is extended or adjusted under 35 U.S.C. 154(b) by 921 days.

(21) Appl. No.: 11/850,634

(22) Filed: Sep. 5, 2007

(65) Prior Publication Data

US 2008/0055247 A1 Mar. 6, 2008

Related U.S. Application Data

(60) Provisional application No. 60/842,436, filed on Sep. 5, 2006.

(51) Int. Cl.
*G06F 3/033* (2006.01)

(52) U.S. Cl. .............................. 345/158; 715/863

(58) Field of Classification Search .......... 345/156–184; 715/700–866; 710/1–74; 178/18.01–19.07; 341/7.1; 340/22
See application file for complete search history.

(56) References Cited

U.S. PATENT DOCUMENTS

| | | |
|---|---|---|
| 5,274,363 A | 12/1993 | Koved |
| 5,581,484 A * | 12/1996 | Prince ............................ 702/150 |
| 6,130,663 A | 10/2000 | Null |
| 6,137,427 A | 10/2000 | Binstead |
| 6,313,825 B1 | 11/2001 | Gilbert |
| 6,937,227 B2 | 8/2005 | Qamhiyah |
| 7,078,911 B2 | 7/2006 | Cehelnik |
| 7,081,884 B2 | 7/2006 | Kong |
| 7,092,109 B2 | 8/2006 | Satoh |
| 7,130,754 B2 | 10/2006 | Satoh |
| 2002/0126090 A1* | 9/2002 | Kirkpatrick et al. .......... 345/158 |
| 2003/0063775 A1* | 4/2003 | Rafii et al. .................... 382/106 |
| 2003/0132913 A1 | 7/2003 | Issinski |
| 2005/0122313 A1* | 6/2005 | Ashby ............................ 345/168 |
| 2005/0129241 A1* | 6/2005 | Hardy et al. .................. 380/270 |
| 2006/0092022 A1 | 5/2006 | Cehelnik |
| 2006/0161871 A1 | 7/2006 | Hotelling |
| 2006/0164241 A1 | 7/2006 | Makela |
| 2006/0224429 A1 | 10/2006 | Mathew |
| 2006/0256090 A1 | 11/2006 | Huppi |
| 2007/0127039 A1 | 6/2007 | Njolstad |

* cited by examiner

*Primary Examiner* — Alexander S Beck
*Assistant Examiner* — Liliana Cerullo

(57) ABSTRACT

A touchless sensing unit (110) and method (210) for calibrating a mobile device for touchless sensing is provided. The method can include evaluating (214) a finger movement within a touchless sensory space (101), estimating (216) a virtual coordinate system (320) from a range of finger movement, and mapping (218) the virtual coordinate system to a device coordinate system (330).

18 Claims, 18 Drawing Sheets

FINGER

THUMB

RANGE CALIBRATION                          214

Estimate a left-right range of finger movement for identifying an X range — 252

Estimate an up-down range of finger movement for identifying a Y range. — 254

Estimate a forward-back range of finger movement for identifying a Z range. — 256

Estimate a rotational range of finger movement for identifying a circumferential range. — 258

FIG 9

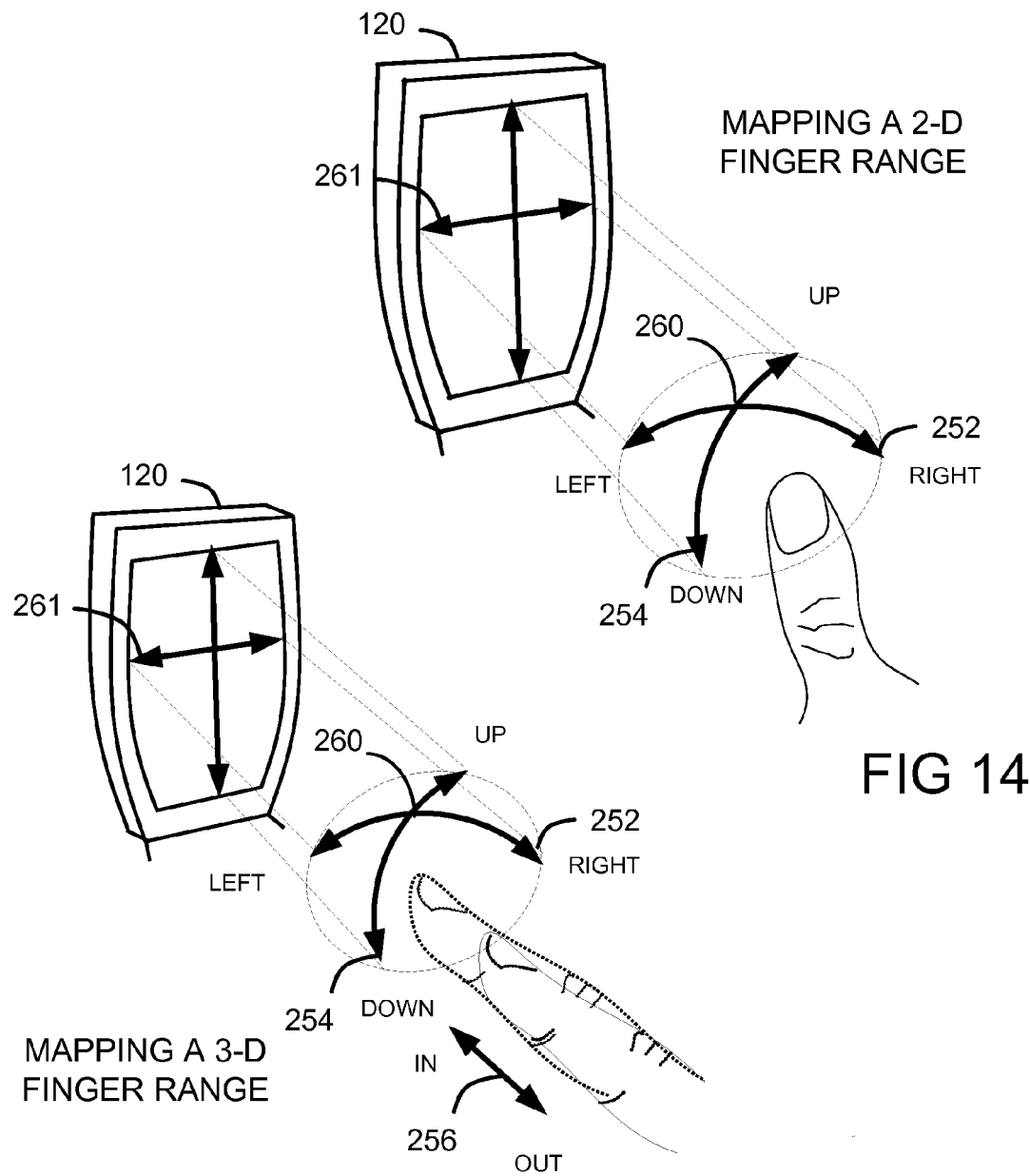

METHOD AND APPARATUS FOR TOUCHLESS CALIBRATION

CROSS-REFERENCE TO RELATED APPLICATION

This application claims the priority benefit of U.S. Provisional Patent Application No. 60/842,436 entitled "Method and Apparatus for Touchless Calibration" filed Sep. 5, 2006, the entire contents of which are hereby incorporated by reference.

This application is also related to U.S. Patent Application No. 60/842,437, filed on the same date as this application.

BACKGROUND

1. Field

The present embodiments of the invention generally relate to the field of mobile devices, more particularly to user interfaces.

2. Description of the Related Art

Mobile communication devices such as cell phones generally include a keypad and display for allowing a user to interact with mobile device applications. A user can navigate through menus presented on the display of the mobile device by depressing one or more keys on a keypad. Some keypads include a navigation pad which allows a user to navigate menus on the keypad in an ergonomic manner. The keypad and the navigation pads are touch-based which require physical user interaction. That is, a user must physically touch the keypad or navigation pad to navigate through a menu system on the display. Moreover, the user can visually see the keypad for identifying the keys to press.

Mobile devices, such as cell phones, are generally limited in size, and thus have small keypads. As one example, certain mobile devices can include small keyboards which allow users to perform text messaging functions. The small size of the keypad can limit the ease at which users can type on the small keypad, or navigate menus on the display via a keypad, to interact with the cell phone. Such keyboards and keypads have keys with a touching area that is generally smaller than the size of a user's finger. The user can also see the keypad although it may be difficult to type with such small keys.

Moreover, certain mobile devices, such as a headset or earpiece, further reduce the touch-based keypad area such that interaction with the headset or earpiece is limited. Furthermore, the user cannot see the keypad or touchpad which may be part of the earpiece. For example, Blue Tooth enabled earpieces, can fit comfortably in a user's ear and provide short range communication with a cell phone on the user's person. However, the user generally interacts directly with the keypad or keyboard of the cell phone, and not the headset or earpiece. In order to navigate menus, a user handles the cell phone associated with the earpiece and navigates through menus presented on the display of the cell phone using the keypad of the cell phone. The user does not generally interact with the headset or earpiece due to the small size of the earpiece and limited area for a keypad. Such user interaction with the cell phone is touch-based and generally requires a user to handle a mobile device.

A motion sensing system can be used to provide touchless control with a device. Touchless control allows a user to control one or more menus or actions on a device via touchless control. A user can interface with one or more controls via touchless control gestures. However, different devices and platforms have different characteristics which alter the performance of the touchless control.

SUMMARY

Broadly stated, embodiments of the invention are directed to a method and system for calibrating a device for touchless control. The method for calibrating the device for touchless control can include evaluating at least one finger movement within a touchless sensory space, and associating the at least one finger movement with at least one control of the device. The associating can calibrate the control with the finger movement. The method can include estimating a virtual coordinate system from a range of finger movement, and mapping the virtual coordinate system to a device coordinate system. The mapping can map at least one location of the finger in the touchless sensory space to at least one location in a device coordinate system. During calibration, a location of the finger movement can be identified and associated with a control on a display of the device. In one arrangement, a variance of the finger movement can calibrate the control.

One aspect includes a calibrating session. During the calibrating session, an image or a video clip can be presented on a display of the device for presenting at least one finger movement. A user can perform a finger movement in accordance with the image or video clip to calibrate a range for touchless control. A finger movement can be associated with a two-dimensional or three-dimensional mapping of a virtual coordinate system. For example, a range of finger movement in an x, y, or z direction can be evaluated for mapping a virtual coordinate system to a device coordinate system. The calibrating session provides a reference for associating finger movements with touchless control.

Another aspect includes a learning session. A plurality of touchless finger movements can be learned by a device for recognizing touchless controls in view of the calibrating. During the learning session, an image or a video clip can be presented on a display of the device for presenting a finger movement. A user can perform the finger movement in accordance with the image or video clip. In response, the calibration unit can learn the finger movement performed by the user and associate variances in finger movement with the touchless control based on the calibrating. An indicator can be presented for informing the user when learning has started and when certain aspects of the learning have completed. During the learning session, a plurality of touchless finger commands such as a jitter finger movement, an up-down jitter movement, a left-right jitter movement, a back-and-forth sweep finger movement, a forward projecting finger movement, a rotational finger movement, and a finger swipe movement can be learned and associated with controls.

A method for operating the device is also provided which can include detecting a first button press, and determining if the first button press is held down within a time duration. If the button press is held down within the time duration, touchless control of the device can be granted. If the first button press is held down longer than the time duration, a calibration of the device for touchless control can start. The method can further include detecting a second button press, and disabling touchless control of the device in response to the second button press. A visual or auditory indicator can be presented during the calibration.

One embodiment of the invention is also directed to a touchless calibration unit. The touchless calibration unit can a plurality of sensors for evaluating at least one finger movement within a touchless sensory field, and associating the at least one finger movement with at least one control of the device for calibrating a touchless control of the device. The calibration unit can estimate a virtual coordinate system from a range of finger movement, and map the virtual coordinate system to a device coordinate system. The mapping can map at least one location of the finger in the touchless sensory space to at least one location in a device coordinate system. In one arrangement, the plurality of sensors can project an approximately planar sensory field in a direction that is approximately perpendicular to a display of the device.

BRIEF DESCRIPTION OF THE DRAWINGS

The features of the embodiments of the invention, which are believed to be novel, are set forth with particularity in the appended claims. Embodiments of the invention, together with further objects and advantages thereof, may best be understood by reference to the following description, taken in conjunction with the accompanying drawings, in the several figures of which like reference numerals identify like elements, and in which:

FIG. 9 is a method for range calibration in accordance with an embodiment of the inventive arrangements;

FIG. 14 is an illustration for two-dimensional mapping in accordance with an embodiment of the inventive arrangements;

FIG. 15 is an illustration for three-dimensional mapping in accordance with an embodiment of the inventive arrangements;

DETAILED DESCRIPTION

Figure 1:
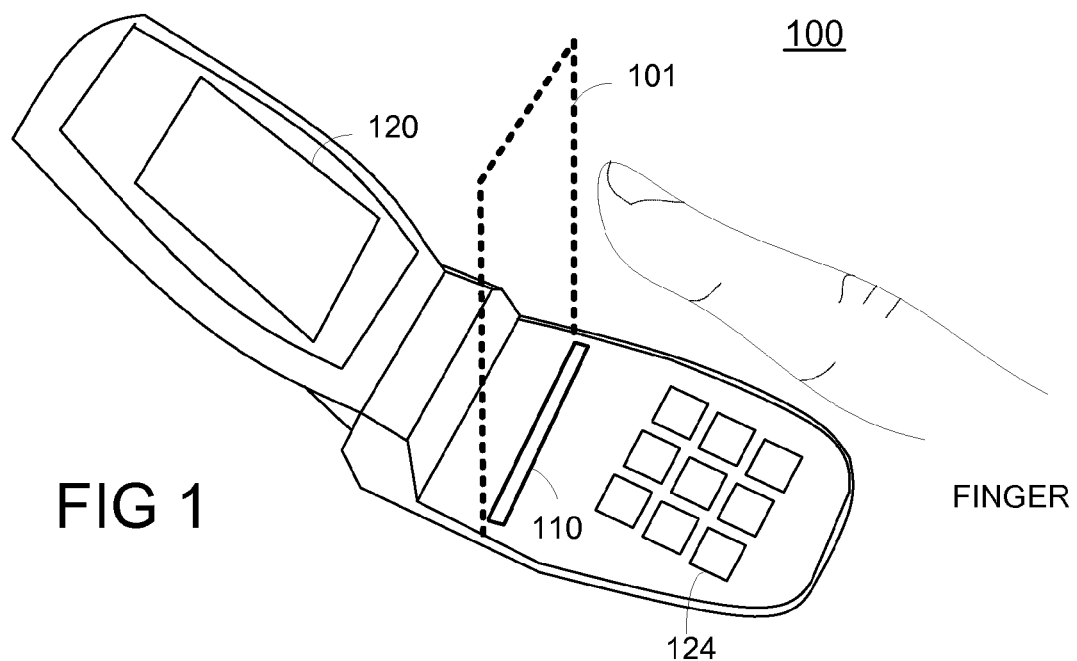
FIG. 1 is a touchless interface for a mobile device in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The term "space" can be defined as exhibiting a three-dimensional aspect. The term "sensory space" can be defined as a three-dimensional volume. The term "field" can be defined as exhibiting a two-dimensional or three-dimensional aspect. The term "earpiece" can be defined as a device having an earpiece attachment that fits on a person's head or an earpiece device that fits within or around a persons ear. The term "touchless" can be defined as not requiring physical touch.

Referring to FIG. 1, a mobile device 100 for providing a touchless user interface 101 is shown. The mobile device 100 can be a cell phone, a radio, a portable music player, a personal security device, an emergency device, a data storage device, a personal profile device, or any other suitable device. The mobile device 100 can include a touchless sensing unit 110 to project a touchless sensory field 101 that provides for a touchless control of the mobile device 100. The touchless sensory field 101 can be projected above the mobile device 100, or on a surface of the mobile device 100, such as the display. The touchless sensing unit 110 may be integrated within a mobile or non-mobile device. As an example, the touchless sensing unit 110 may be a control component in a vehicle, or a computer keyboard system. The touchless sensing unit 110 may also be integrated with the mobile device 100 such as shown in FIG. 1, as an example, but is not limited to such an arrangement.

Figure 2:
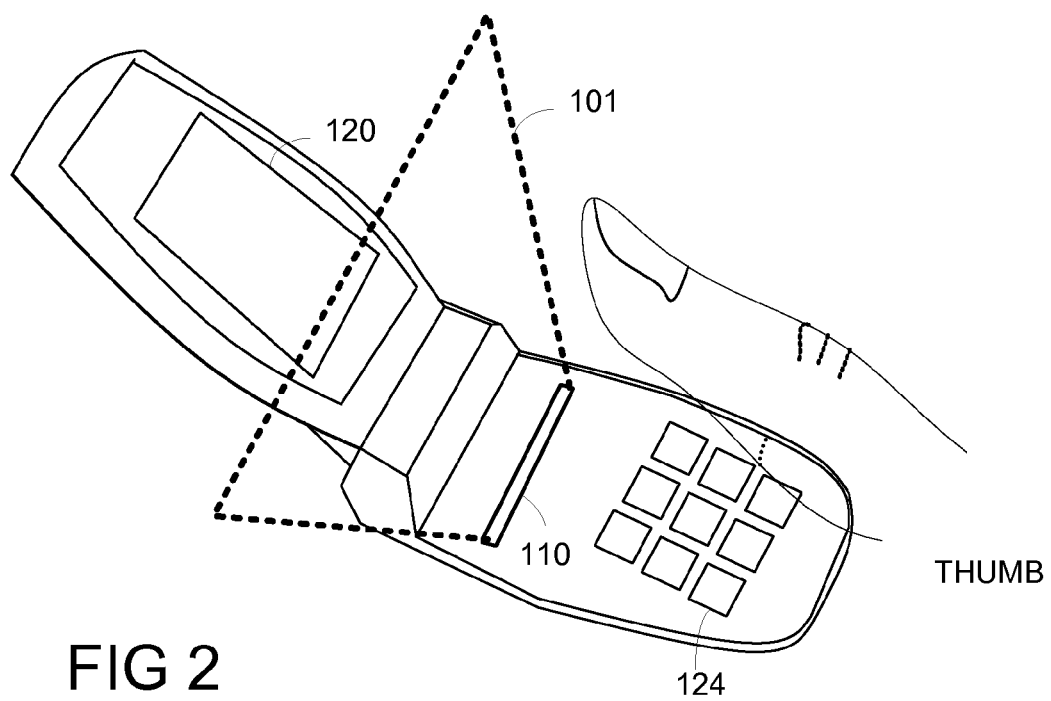
FIG. 2 is a wider touchless interface for a mobile device in accordance with an embodiment of the inventive arrangements.

Referring to FIG. 2, a wider touchless sensing field 101 is shown. The wide aspect is well suited for using a thumb for touchless control. In practice, a user can interact with one or more controls on a display 120 of the mobile device 100 via touchless sensing. For example, a user can move a finger or a thumb in the touchless sensory field 101 to control one or more objects in the display 120. An object may be a menu item, an entry, a scroll list, a mobile device control, or any other suitable item for interfacing with the mobile device 100. For example, a user can select menu buttons on the display 120 by issuing certain finger movements, or locations of the finger, associated with the control.

The mobile device 100 can operate in a general mode or a touchless control mode. In general mode, a user touches one or more soft-keys on a keypad 124 of the mobile device 100 for interacting with objects in the display 120, as is known in the art. In touchless control mode, the user can interact with the objects via touchless finger movements. For example, a user can point the finger to the right to acquire control of a menu item on a right of the display, or point to the left to acquire a control of a menu item on the left of the display. A user can perform a finger movement to select an object, wherein the touchless sensing unit 110 recognizes the behavior and associates the behavior with a control. As another example, a user can adjust an audio control such as bass, treble, or volume by issuing touchless controls. The user can move a finger up and down to change a volume, or perform a double click operation to select a menu.

In one arrangement, each location of the finger in the touchless sensory space 101 can be associated with a location on the display 120. Accordingly, each finger can be mapped to a control on the display 120. For example, the user can navigate to objects in the display 120 by moving the finger to a location in the touchless sensory field 101 that corresponds to the location of the object in the display 120. In another arrangement, a relative movement of the finger can be associated with a control on the display 120. For example, a rotational finger movement can be associated with a scrolling action for scrolling through menu items on the display 120. The rotational movement may or may not depend on the location of the finger. For example, the user can issue the rotational movement anywhere in the touchless sensory space 101 for performing a scrolling operation.

In general, a user may be holding the mobile device with one hand and performing touchless control with the same hand or the other hand. In the former, a user can position the mobile device 100 within the palm of the hand and position the thumb of the same hand within the sensing field. The user can move the thumb in various directions to interact with the mobile device 100 via touchless control. For example, the user can use the thumb to navigate to certain menu entries in the display, or perform certain thumb movements to acquire a control. In the latter, a finger of the second hand of the user may be used for touchless control of the mobile device. For example, the user can hold the mobile device in the first hand and use an index finger of the second hand to perform touchless control. The finger of the second hand may provide the user with more finger movement variability in the touchless sensory field. That is, the finger movement of the second hand may span a broader usage area, than the thumb which may be limited in physical movement due to the simultaneous handling of the phone.

Figure 3:
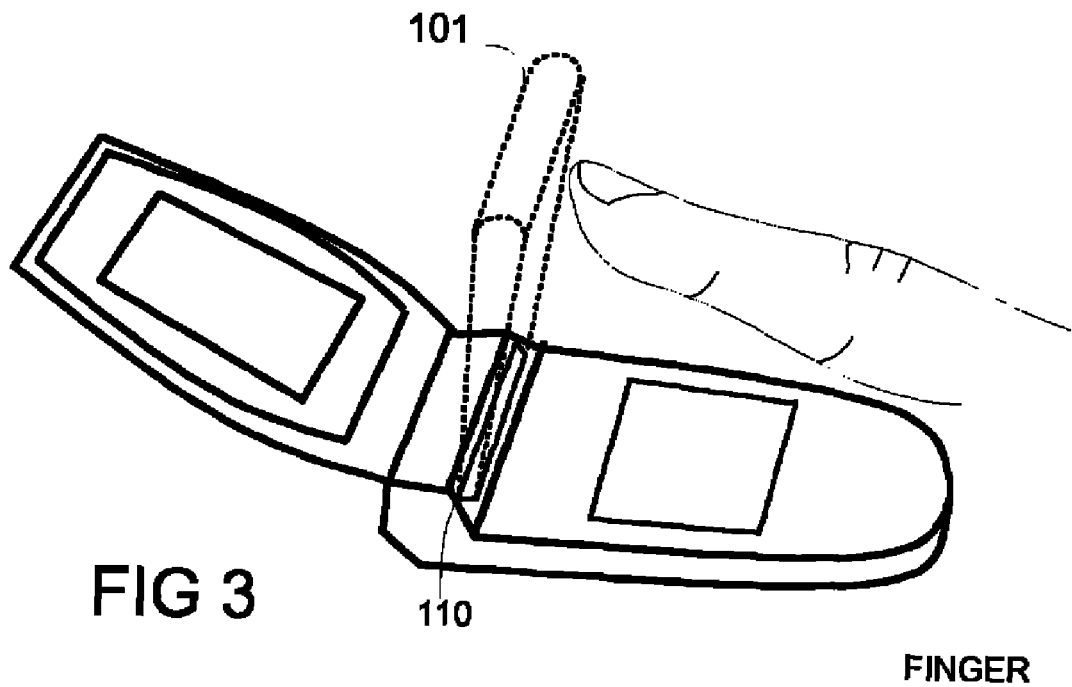
FIG. 3 is a first location of a touchless sensing unit on a mobile device in accordance with an embodiment of the inventive arrangements.
Figure 4:
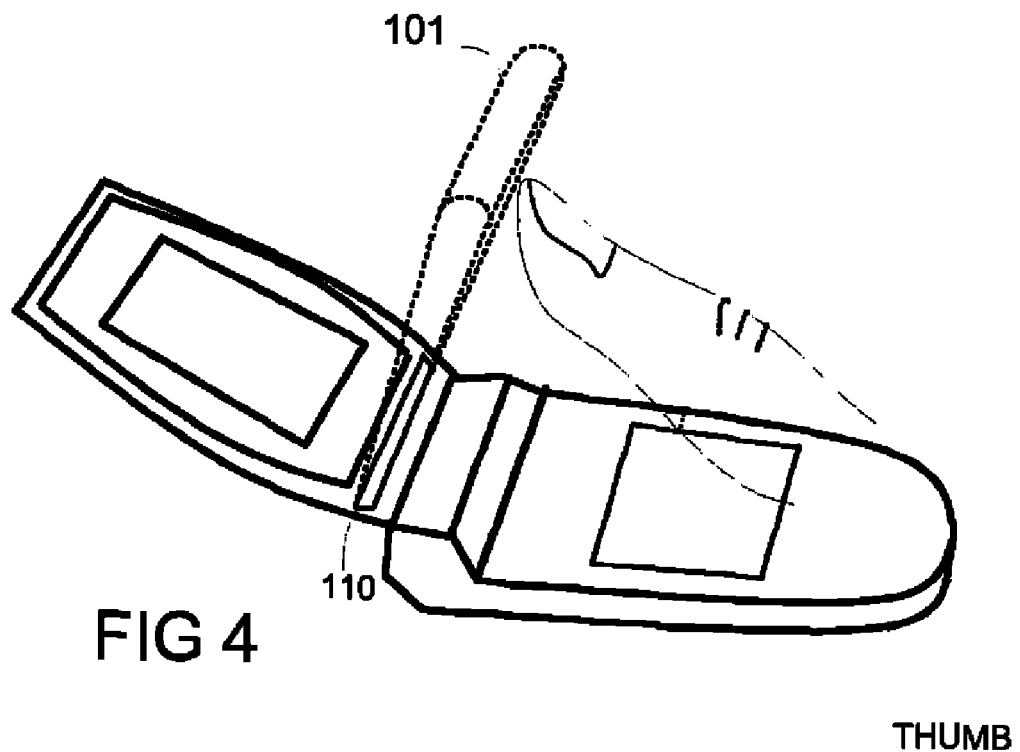
FIG. 4 is a second location of a touchless sensing unit on a mobile device in accordance with an embodiment of the inventive arrangements.

Briefly, referring to FIG. 3, a first location of the touchless sensing unit 110 on the mobile device is shown. In this arrangement, the touchless sensory field 101 projects more towards the user than when the touchless sensing unit 110 is directly above the keypad 124 as shown if FIG. 1. Referring to FIG. 4, a second location of the touchless sensing unit 110 on the mobile device is shown. In this arrangement, the touchless sensory field 101 projects even more towards the user than when the touchless sensing unit 110 is in the first location as shown if FIG. 3. It should be noted that the location of the touchless sensing unit 110 on the mobile device can affect a touchless control performance.

As an example of affecting touchless control performance, one embodiment of the touchless sensing unit 110 may include an array of ultrasonic sensors. The ultrasonic sensors can track a location and movement of the finger based on pulse-echo detection. For example, a high energy signal can be emitted in a direction of the finger, and a return signal can be evaluated for identifying a time of flight. A location of the finger can be determined from the time of flight based on multi-path signal processing algorithms. The location of the finger can be associated with one or more controls on the display 120. Depending on the location and the angle of the touchless sensing unit 110, reflections off the mobile device may affect ultrasonic signal resolution differently. That is, detecting the location of the finger can depend on the orientation and location of the touchless sensing unit 110. Similarly, in another embodiment, wherein light sensors are employed, the orientation, angle, and location of the touchless sensing unit 110 can affect an intensity of the light signals. Accordingly, touchless control may vary depending on the location and placement of the touchless sensing unit 110. The signal resolution for providing touchless control is a function of the location and orientation of the touchless sensing unit 110.

The touchless sensing unit 110 can include settings to adjust a strength, or projection capability, of the touchless sensory field. For example, referring to FIG. 5, the touchless sensing unit 100 can be set to provide an approximately planar touchless sensory field 107. An approximately planar sensory field 107 may be useful for two-dimensional control, such as navigating a cursor on the display 120 in accordance with a finger movement. A narrow sensory field is beneficial when using a thumb of the first hand as discussed in FIG. 4. As another example, two-dimensional control can be used to select an object on the display 120, such as a list of menu items. An approximately planar sensory field 107 is beneficial when general keypad use is combined with touchless control. For example, the approximately planar sensory field 107 projects sufficiently out of range of the keypad 124, such that a user can use the keypad 124 without acquiring touchless control. That is, the finger is not within the touchless sensory field 107 and not interacting with any controls on the display 120.

Moreover, the approximately planar sensory field 107 allows the touchless sensing unit 110 to differentiate between a finger and a thumb. The thumb is generally wider in area than a finger tip and thus provides a stronger reflection. Accordingly, a return signal strength of a finger and a thumb can be compared for identifying the presence of either the finger or thumb. In practice, a history of the signal strength returns at specific locations are saved and compared to current signal strength returns at the same specific locations. The signal strengths can be compared to strengths captured during calibration when it is known whether the user is using a finger or thumb. Secondly, the range which the thumb spans is less than the range the finger can move. When a thumb of the first hand that is handling the mobile device is used for touchless control, the thumb is more limited in movement. In contrast, the finger of the second hand can span a wider range for touchless control. The touchless sensing unit 110 can assess the signal strength return in combination with the finger movement range to differentiate between a thumb and a finger. Also, depending on whether a finger or a thumb is detected, different control options can be presented. For example, less involved user interfaces can be presented for thumb mode, and more sophisticated interfaces can be used for finger mode.

Figure 5:
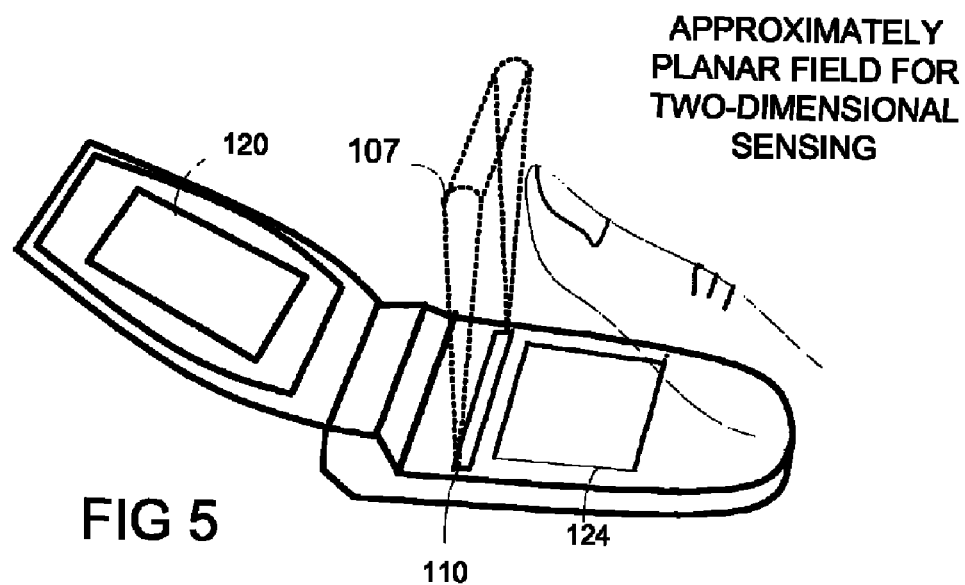
FIG. 5 is an approximately planar touchless sensory field in accordance with an embodiment of the inventive arrangements.
Figure 6:
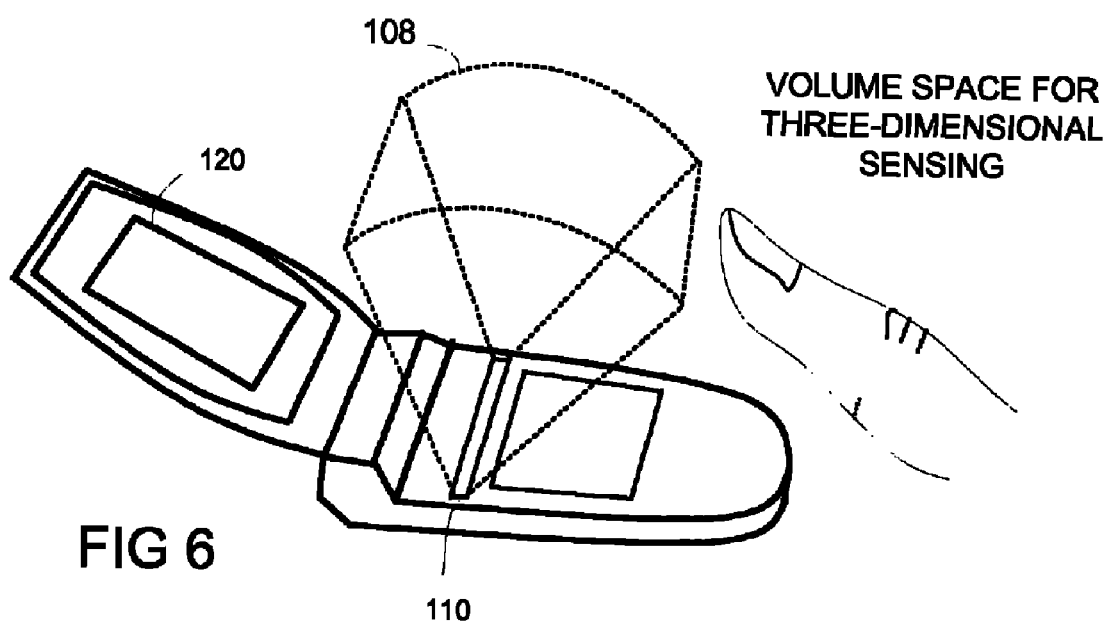
FIG. 6 is a touchless sensory space in accordance with an embodiment of the inventive arrangements.

Referring to FIG. 6, the touchless sensing unit 100 can also be set to provide a touchless sensory space 108. For example, the touchless sensory field 101 of FIG. 1 can be broadened to encompass a wider volume for detecting finger movement. A user can move a finger anywhere within the touchless sensory space 108 to interact with the mobile device 100. In particular, the touchless sensory space 108 of FIG. 6 provides a third dimension to the touchless sensory field 107 of FIG. 5. A broader sensory space is beneficial when using a finger of the second hand as discussed in FIG. 4. In such regard, a forward projecting and retracting finger movement can be identified and associated with another control, or another aspect of a control. For example, a user may be playing a three dimensional video game. The user can control a movement of a character in the video game via touchless finger movement. For example, the user can move the character left and right through left and right finger movement, up and down through up and down finger movements, and ahead and back through forward projecting and retracting finger movements.

Notably, touchless control of the mobile device depends on the orientation, location, and settings of the touchless sensing unit 110 as exemplified in FIGS. 3 to 6. Accordingly, different mobile devices having different touchless sensing unit configurations may respond differently to the same finger movements. For example, a same finger movement in the touchless sensory fields of FIGS. 2 to 6 may elicit different behaviors as a result of differing echo reflections. Accordingly, embodiments of the invention are directed to calibrating a mobile device for touchless control as a result of the effect of touchless sensing unit orientation, placement, and location.

Figure 7:
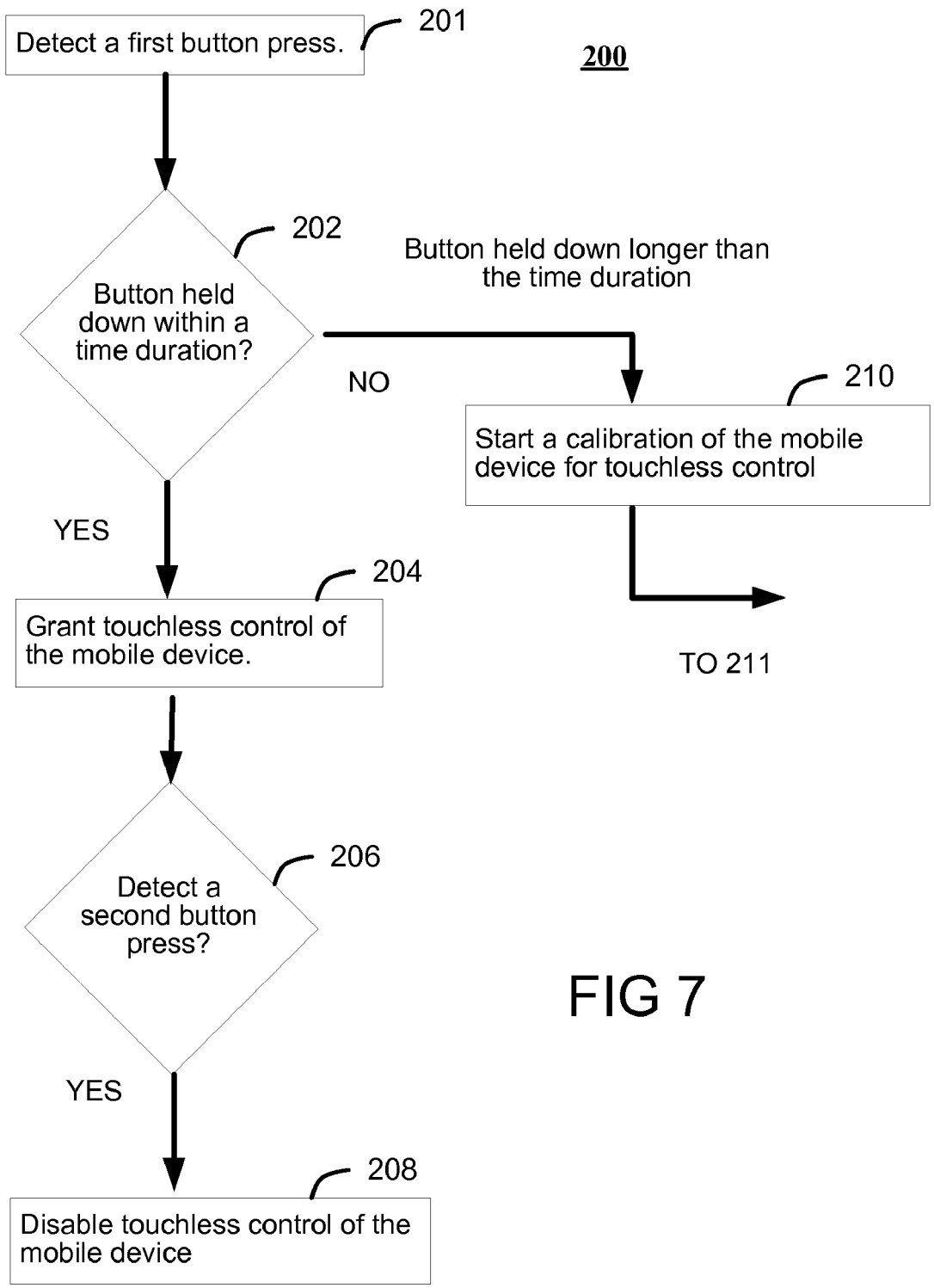
FIG. 7 is a flowchart for operating a touchless interface with a mobile device in accordance with an embodiment of the inventive arrangements.

Referring to FIG. 7, a flowchart 200 for operating a mobile device is shown. Briefly, a user can initiate touchless control or start a calibration of the device by following the steps of flowchart 200. At step 201, a first button press can be detected. For example, referring to FIG. 1, a key on the keypad 124 can be pressed, or any other key on the mobile device 110 can be pressed. At step 202, a determination can be made if the key was held down within a certain time duration. For example, a processor internal to the mobile device can estimate how long the key (e.g. button) is held down. If the button is held down within the time duration, touchless control can be granted at step 204. Touchless control allows a user to interact with the device via touchless finger movements and commands. At step 206, a second determination can be made if a second button press was performed during touchless control. Upon detecting a second button press, touchless control of the mobile device can be disabled. The user will no longer be able to control the device via touchless control. Returning back to decision block 202, if the button is held down longer than the time duration, a calibration of the mobile device for touchless control can start. Briefly, calibrating the mobile device for touchless control includes assessing a range of finger movement in the touchless sensing space, and learning one or more touchless finger movements for association with device controls.

As an example, referring to FIG. 1, a user of the mobile device 100 may place the mobile device 100 in touchless control mode by pressing a key (e.g. button) on the keypad 124. If the button press is sufficiently brief, touchless control will be granted. Accordingly, the user can interact with the mobile device via touchless control. For disabling touchless control, the user can press the button a second time. In this manner, a single button or soft key, can be employed to turn on and off touchless control. In another arrangement, touchless control can be granted when a certain user interface is presented, a flip-top of the mobile device is opened, a voice command, a new user is identified, or any other user selectable feature. A settings option in the mobile device can decide how touchless control is granted and is not limited to the button press. A user can decide how touchless control is granted. Notably, a single button press is merely one way of initiating control, and many other means are herein contemplated.

Continuing with the example, if the user holds the button down for a predetermined amount of time, the user can enter a calibration mode for the mobile device. The user may enter calibration mode to restore a touchless control performance, an abrupt handling of the device, or a new user operating the mobile device. Calibration mode reconfigures the mobile device for optimizing touchless control.

Figure 8:
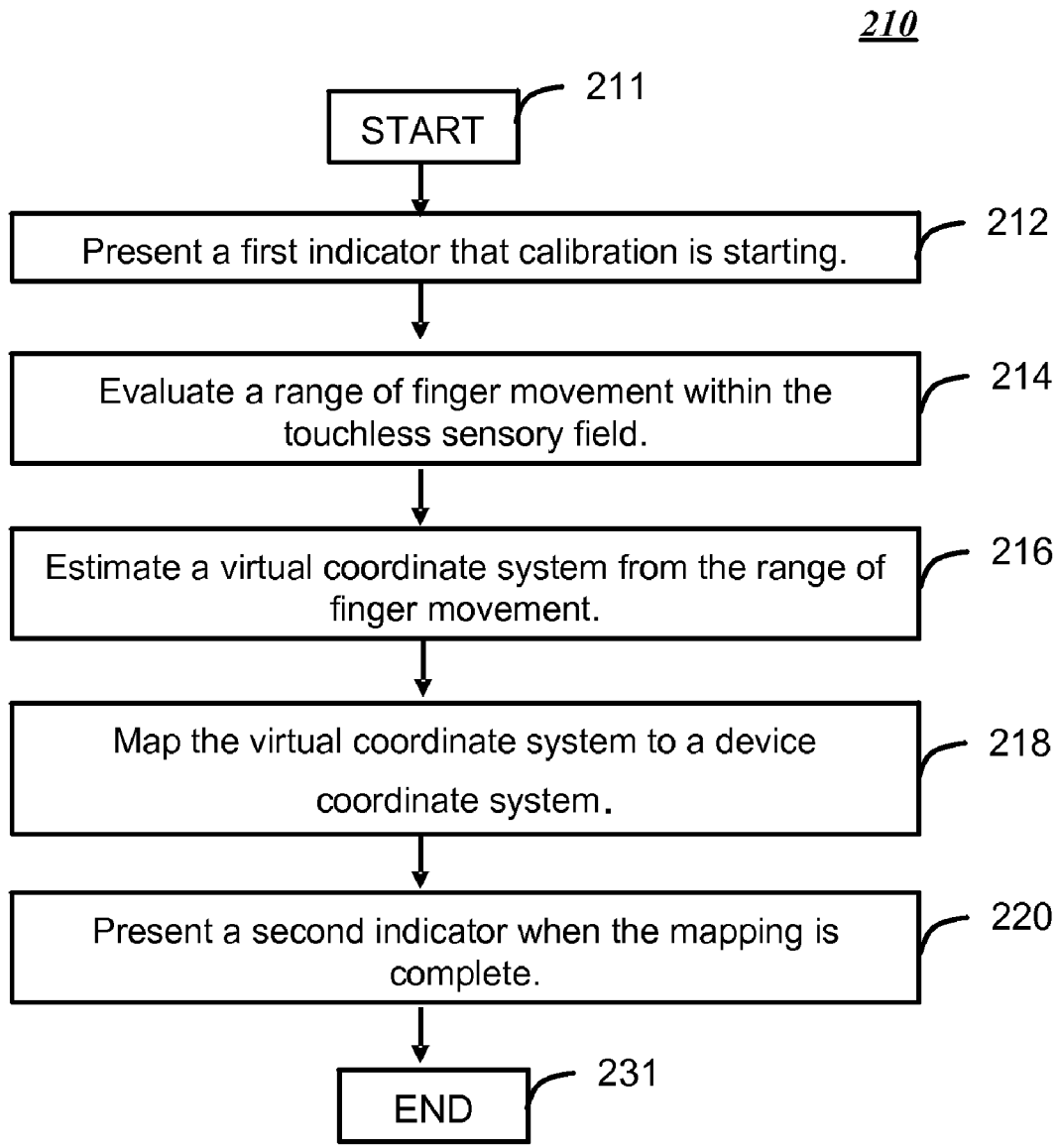
FIG. 8 is a method for calibrating a mobile device for touchless control in accordance with an embodiment of the inventive arrangements.

Referring to FIG. 8, a method 210 for calibrating a mobile device for touchless control is shown. The method 210 can be practiced with more or less than the number of steps shown. To describe the method 210, reference will be made to FIGS. 3, 5 and 7 although it is understood that the method 210 can be implemented in any other suitable device or system using other suitable components. Moreover, the method 210 is not limited to the order in which the steps are listed in the method 210 In addition, the method 210 can contain a greater or a fewer number of steps than those shown in FIG. 8.

At step 211, the method can begin. As an example, the method can begin when a button is held down for predetermined duration as discussed at step 201 in FIG. 7. It should be noted, the method 210 is not dependent on a button press for initiating calibration and can start for various other reasons.

At step 212, a first indicator can be presented that calibration is started. For example, upon entering calibration mode, a display can be presented to inform the user that a calibration mode has been entered. Alternatively, a sound can be audibly played or a visual element can be lighted to inform the user. It should be noted that step 212 is an optional step and not required for calibration.

At step 214, a range of finger movement within the touchless sensory field can be evaluated. Evaluating the range of finger movement informs the touchless sensing unit 110 (See FIG. 3) of the bounds for associating finger movement with a control range. At step 216, a virtual coordinate system can be estimated from the range of finger movement. The virtual coordinate system is associated with a physical coordinate system of the finger movement. Notably, the bounds of the virtual coordinate system are determined from the range of finger movement. At step 218, the virtual coordinate system is mapped to a device coordinate system. For example, referring back to FIG. 5, the device coordinate system may be the display coordinate system. Accordingly, mapping the virtual coordinate system to the device coordinate system is analogous to mapping the entire range of finger movement to the display. That is, each location of the finger in the touchless sensory space 101 can be associated with a location on the display 120. At step 220, a second indicator can be presented when the mapping is complete. Notably, step 220 is optional to the calibration and is useful for informing the user of the calibration status. At step 231, the method can end.

Referring to FIG. 9, the method 214 for estimating a range of finger movement corresponding to step 214 of FIG. 8 is shown. The method 214 is not limited to the arrangement shown in FIG. 8, and the method steps do not have to be practiced in the order shown. It should be noted that, more than or less than the number of steps can be performed for practicing the method 214. Briefly, method 214 identifies steps for evaluating a plurality of finger movement ranges. In the provided example, four ranges are evaluated for identifying the range and bounds of finger movement for mapping to the device coordinate system. Three of the ranges correspond to the (X,Y,Z) dimensions of a Cartesian Coordinate system, and the fourth dimension corresponds to a perimeter of the finger movement boundary. Notably, evaluating a range is not limited to the method steps shown in FIG. 9. For example, diagonal range measurements can be evaluated fro mapping a range of finger movement.

Figure 10:
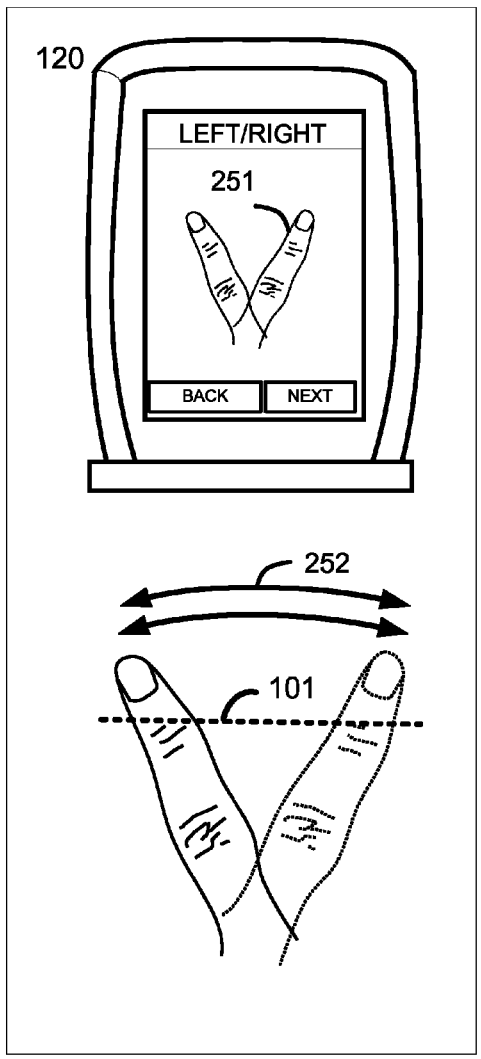
FIG. 10 is a tutorial display for calibrating a first range in accordance with an embodiment of the inventive arrangements.

At step 252, a left-right range of finger movement can be estimated for identifying an X range. For example, briefly referring to FIG. 10, an illustration for teaching a left-right finger movement to associate with the X range is shown. An image or video clip 251 of a left-right finger movement can be presented on the display 120 for informing the user of the expected finger behavior. The user can visualize the illustration and perform the finger movement 252 presented in the display 120. The touchless sensing unit 110 (See FIG. 3) can evaluate the range from the left-right finger movement. Specifically, FIG. 10 shows a full left-right sweep of the finger to estimate the entire X range of finger movement.

Figure 11:
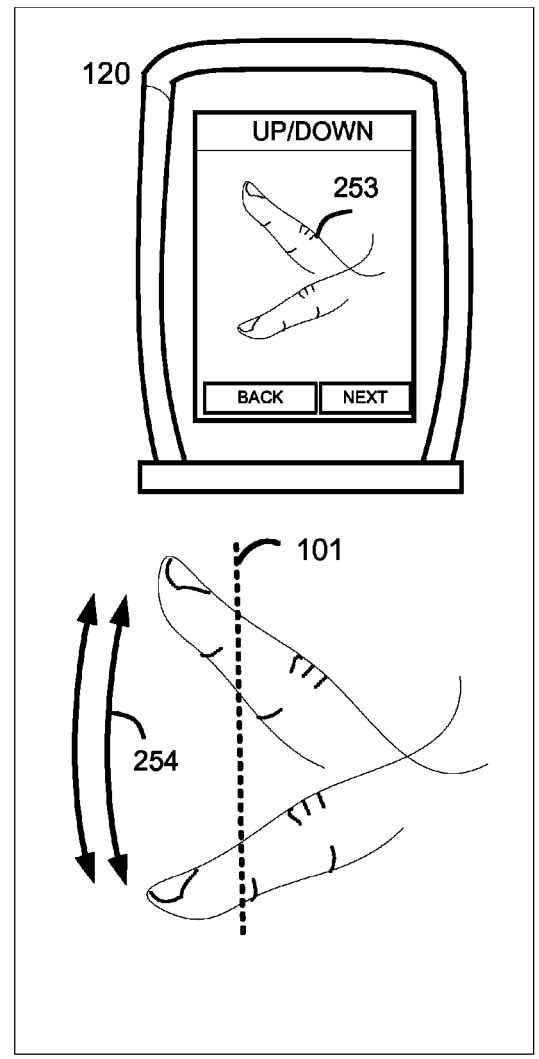
FIG. 11 is a tutorial display for calibrating a second range in accordance with an embodiment of the inventive arrangements.

At step 254, an up-down range of finger movement can be estimated for identifying an Y range. For example, briefly referring to FIG. 11, an illustration for teaching an up-down finger movement to associate with the Y range is shown. For example, an image or video clip 253 of an up-down finger movement can be presented on the display 120 for informing the user of the expected finger behavior. The user can visualize the illustration and perform the finger movement 254 presented in the display 120. The touchless sensing unit 110 (See FIG. 3) can evaluate the range from the up-down finger movement. Specifically, FIG. 11 shows a full up-down sweep of the finger to estimate the full Y range of finger movement.

Figure 12:
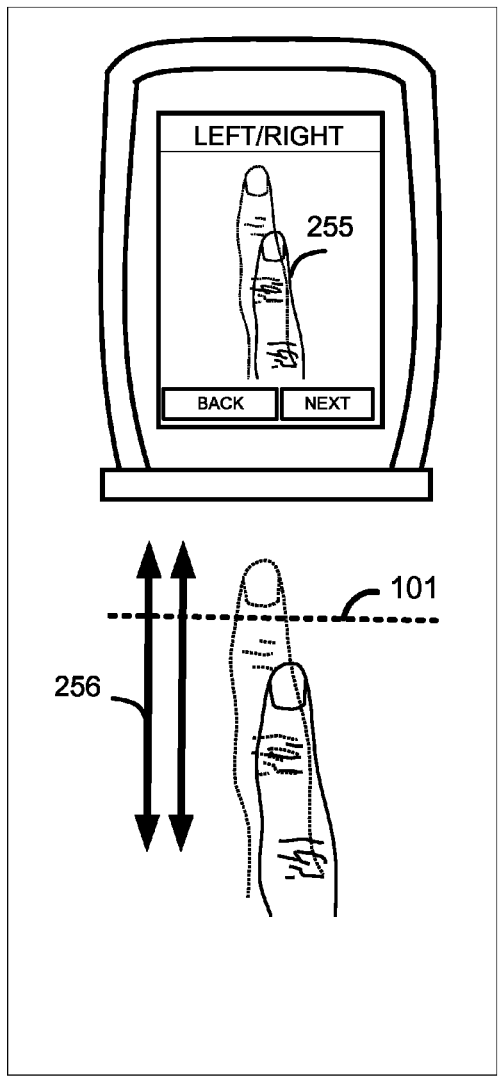
FIG. 12 is a tutorial display for calibrating a third range in accordance with an embodiment of the inventive arrangements.

At step 256, a forward-backward range of finger movement can be estimated for identifying an Z range. For example, briefly referring to FIG. 12, an illustration for teaching a forward-backward finger movement to associate with the Z range is shown. For example, an image or video clip 255 of a forward-backward finger movement can be presented on the display 120 for informing the user of the expected finger behavior. The user can visualize the illustration and perform the finger movement 256 presented in the display 120. The touchless sensing unit 110 (See FIG. 3) can evaluate the range from the forward-backward finger movement. Specifically, FIG. 12 shows a full forward-backward sweep of the finger to estimate the full Z range of finger movement.

Notably, the left-right, up-down, and forward-backward finger movement is relative to the user handling the mobile device. That is, the (X,Y,Z) finger sweeps are relative to the range of finger motion by the user handling the device.

Figure 13:
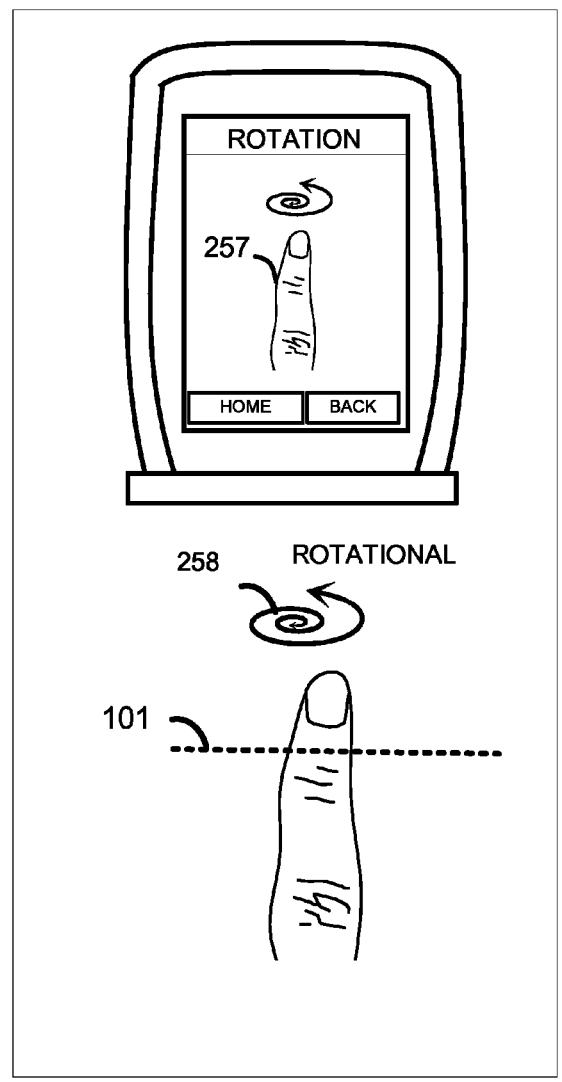
FIG. 13 is a tutorial display for calibrating a fourth range in accordance with an embodiment of the inventive arrangements.

At step 258, a rotational range of finger movement can be estimated for identifying an circumferential range. The circumferential range identifies the perimeter of the outermost finger movement. For example, briefly referring to FIG. 13, an illustration for teaching a rotational finger movement to associate with the circumferential range is shown. For example, an image or video clip 257 of a rotational finger movement can be presented on the display 120 for informing the user of the expected finger behavior. The user can visualize the illustration and perform the finger movement 258 presented in the display 120. The touchless sensing unit 110 (See FIG. 3) can evaluate the range from the rotational range finger movement. Specifically, FIG. 13 shows a full rotation of the finger to estimate the full circumferential range of finger movement.

Upon evaluating one or more ranges of finger motion, a virtual coordinate system is created. That is, the range of physical movement of the finger is associated with a coordinate system considered virtual. For example, each range of finger movement can be associated with a principal axis of a coordinate system.

Referring to FIG. 14, a two-dimensional virtual coordinate system 260 and device coordinate system 261 is shown. Notably, the left-right finger movement of step 252 corresponds to an X axis on the virtual coordinate system 260 and the device coordinate system 261. The up-down finger movement of step 254 corresponds to a Y axis on the virtual coordinate system and the device coordinate system 261. The rotational movement of step 258 corresponds to the boundary of the virtual coordinate system 261

Referring to FIG. 15, a three-dimensional virtual coordinate system 260 and device coordinate system 261 is shown. In particular, the back-forth finger movement of step 256 corresponds to a Z axis on the virtual coordinate system 260 and the device coordinate system 261. The rotational movement of step 258 corresponds to the boundary of the virtual coordinate system 261.

Figure 16:
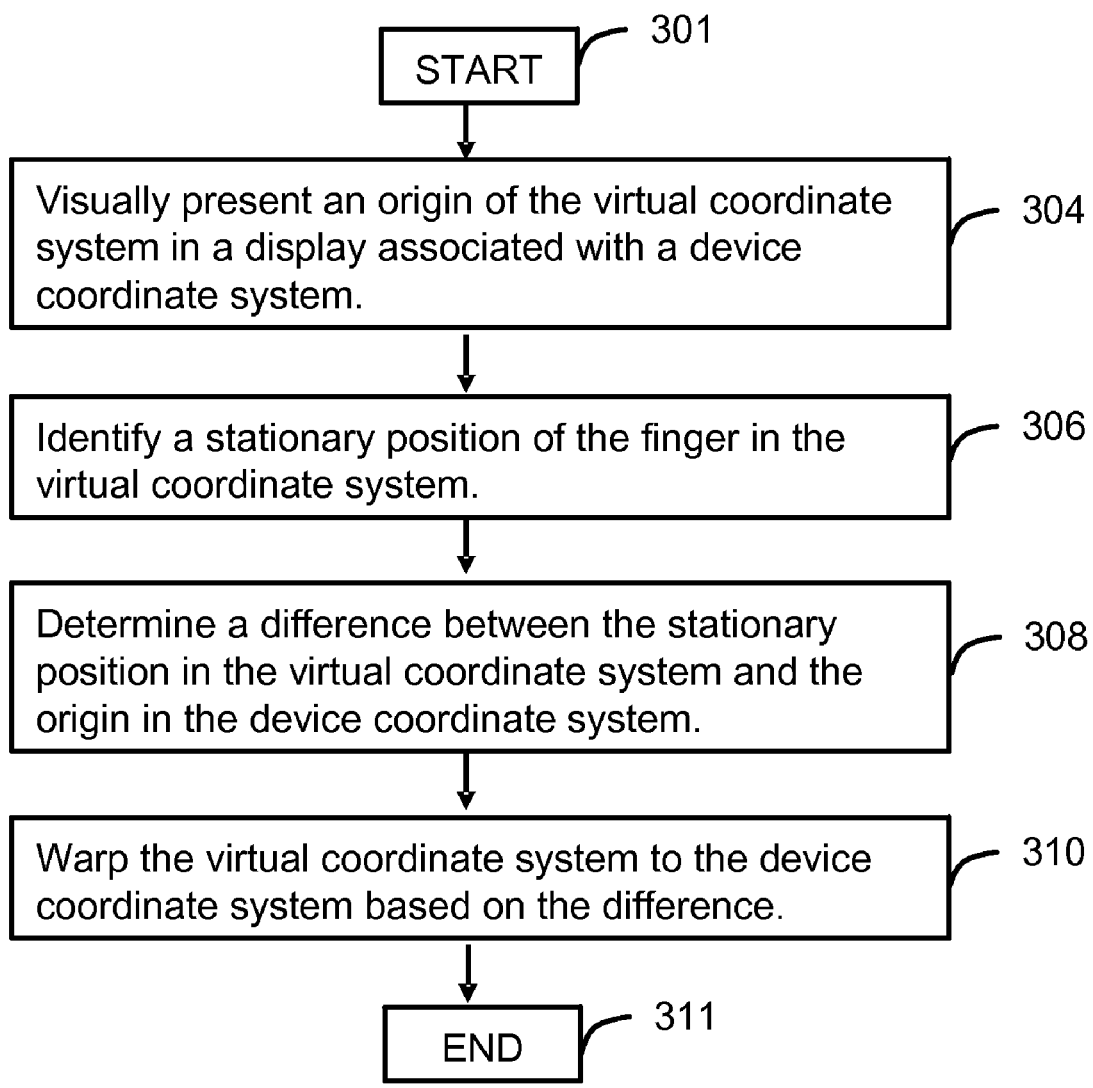
FIG. 16 is method for mapping a virtual coordinate system to a device coordinate system in accordance with an embodiment of the inventive arrangements.

Referring to FIG. 16, a method 300 for mapping a virtual coordinate system to a device coordinate system is shown. The method 300 can be practiced with more or less than the number of steps shown. Moreover, the method 300 is not limited to the order in which the steps are listed in the method 300 In addition, the method 300 can contain a greater or a fewer number of steps than those shown in FIG. 16.

Figure 17:
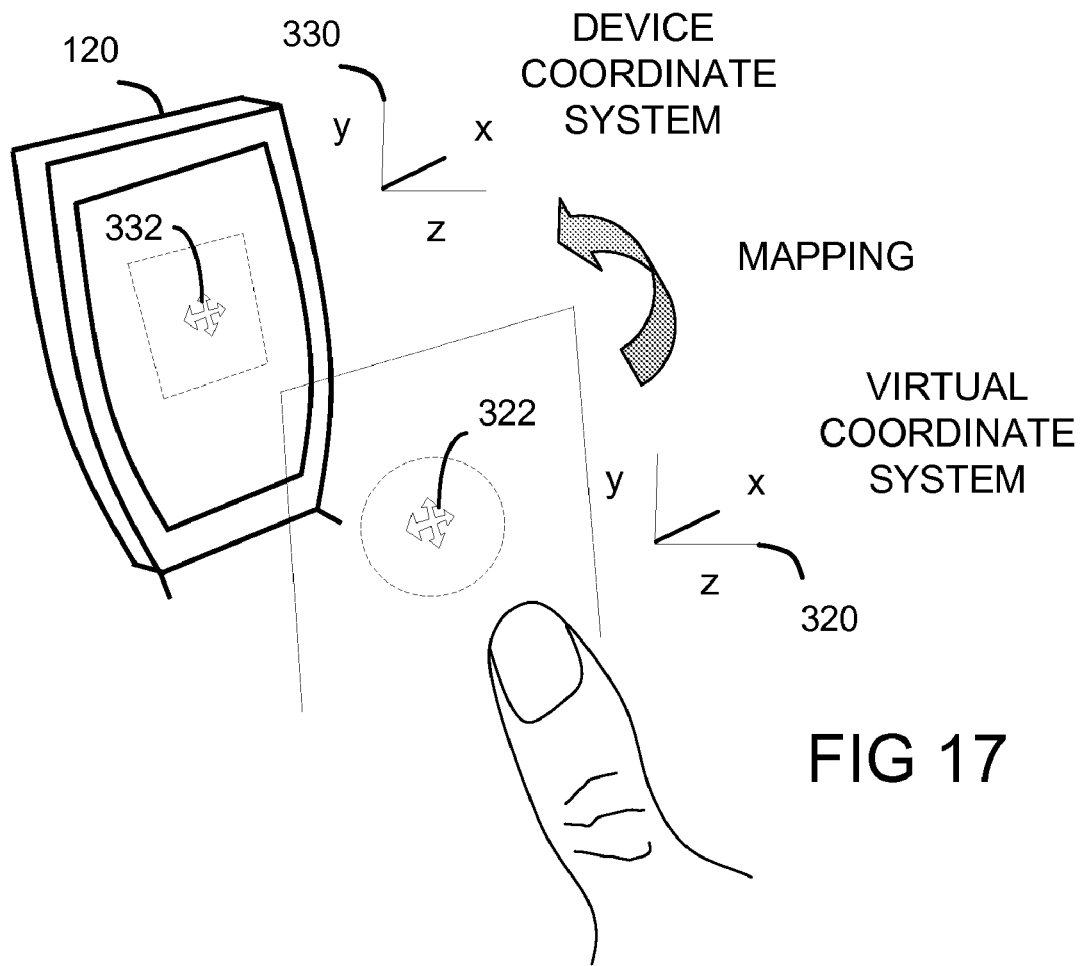
FIG. 17 is side perspective for touchless control of a mobile device in accordance with an embodiment of the inventive arrangements.

At step 301, the method 300 can begin. The method can begin in a state wherein a virtual coordinate system has been estimated from a range of finger movement as presented in method step 216 of FIG. 5. At step 304, an origin of the virtual coordinate system can be visually presented in a display associated with a device coordinate system. For example, referring to FIG. 17, an origin 322 of the virtual coordinate system 320 can be presented in the display corresponding to the device coordinate system 330. That is, upon evaluating the entire range of finger movements, an origin 332 in the device coordinate system can be determined. A finger at the origin 322 in the virtual coordinate system should correspond to the origin 332 in the center of the display 120. However, the centering of the origin depends on how the user's hand or finger movement is oriented relative to the touchless sensing unit 110. That is, the default location for where the user holds their finger should correspond to the center of the display.

Briefly, the touchless sensing unit 110 (See FIG. 3) can identify an origin from the echo return signals generated in response to the range of finger movements. Specifically, the touchless sensing unit samples a physical location of the finger in the touchless sensory field as the finger moves across the range. The touchless sensing unit can identify the origin from the physical locations.

At step 306, a stationary position of the finger in the virtual coordinate system is identified. For example, upon completion of range calibration, the user is prompted to hold their finger still at a location they consider the origin relative to their finger movement. For example, referring to FIG. 17, the user is requested to hold their finger at the center of the touchless sensing field 101. The touchless sensing unit 110 identifies the location of the finger in the virtual coordinate system 320. At step, 308, a difference is determined between the stationary position in the virtual coordinate system 320 and the origin in the device coordinate system 330. That is, the touchless sensing unit compares the physical origin of the finger in the virtual coordinate system 320 with the estimated origin based on range calibration in the display 120. At step 310, the virtual coordinate system 320 is warped to the device coordinate system 330 based on the difference. That is, the difference in the physical location of the finger centered at the virtual coordinate system origin, and the estimated location of the origin based on the range calibration is modified to account for differences in the location of the origin. In particular, the warping provides a non-linear mapping of the virtual coordinate system 320 to the device coordinate system 330. At step 311, the method 300 can end.

Figure 18:
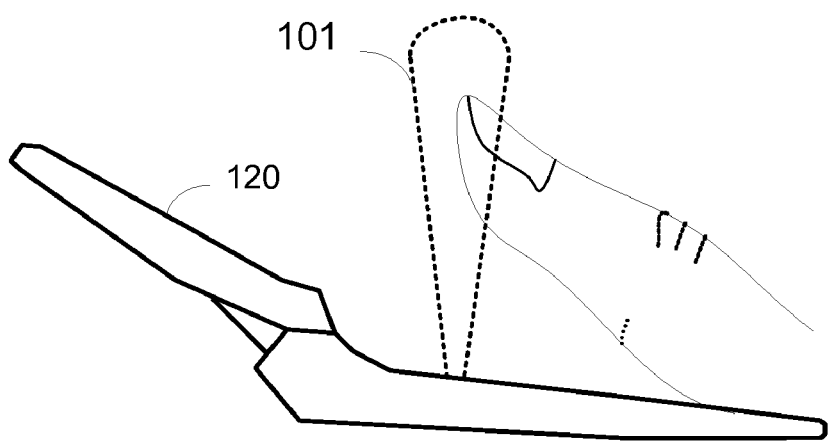
FIG. 18 is an illustration for mapping a coordinate system in accordance with an embodiment of the inventive arrangements.

Referring to FIG. 18, the virtual coordinate system 320 and the device coordinate system 330 are shown. The virtual coordinate system 320 corresponds to a physical coordinate system of the finger movement, and the device coordinate system 330 corresponds to the display 120 in the illustration shown. Notably, the device coordinate system is not limited to the display. For example, a touchless head set without a display can be controlled through touchless control. Accordingly, the device coordinate system may correspond to the physical location of the virtual coordinate system.

Figure 19:
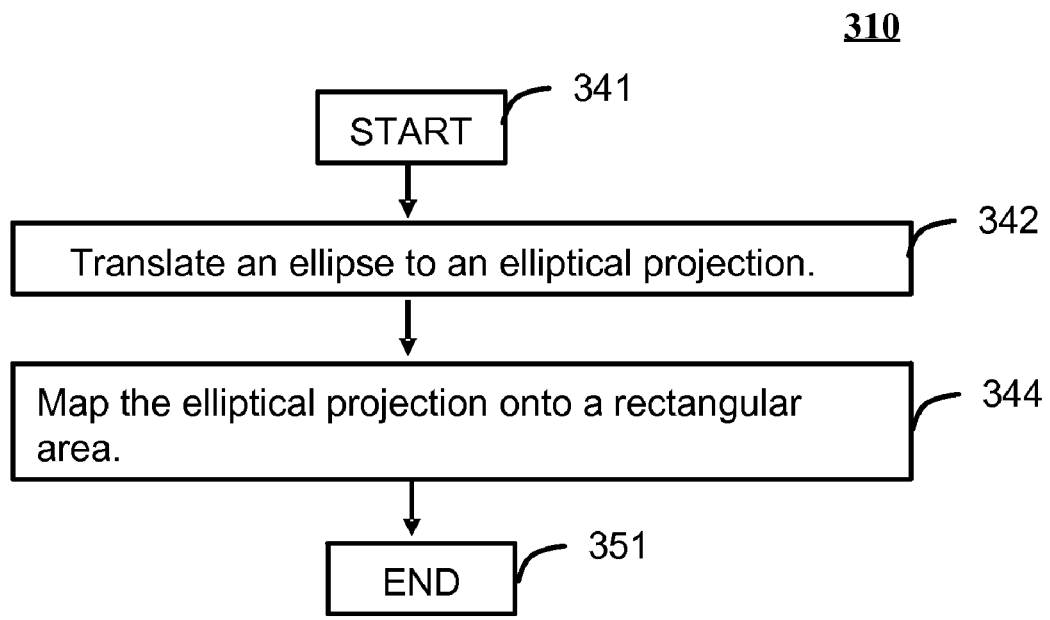
FIG. 19 is a method for warping a coordinate system in accordance with an embodiment of the inventive arrangements.

Referring to FIG. 19, the method 310 for warping the virtual coordinate system 320 to the device coordinate system 330 is shown. The method 310 can be practiced with more or less than the number of steps shown. Moreover, the method 310 is not limited to the order in which the steps are listed in the method 310 In addition, the method 310 can contain a greater or a fewer number of steps than those shown in FIG. 19.

Figure 20:
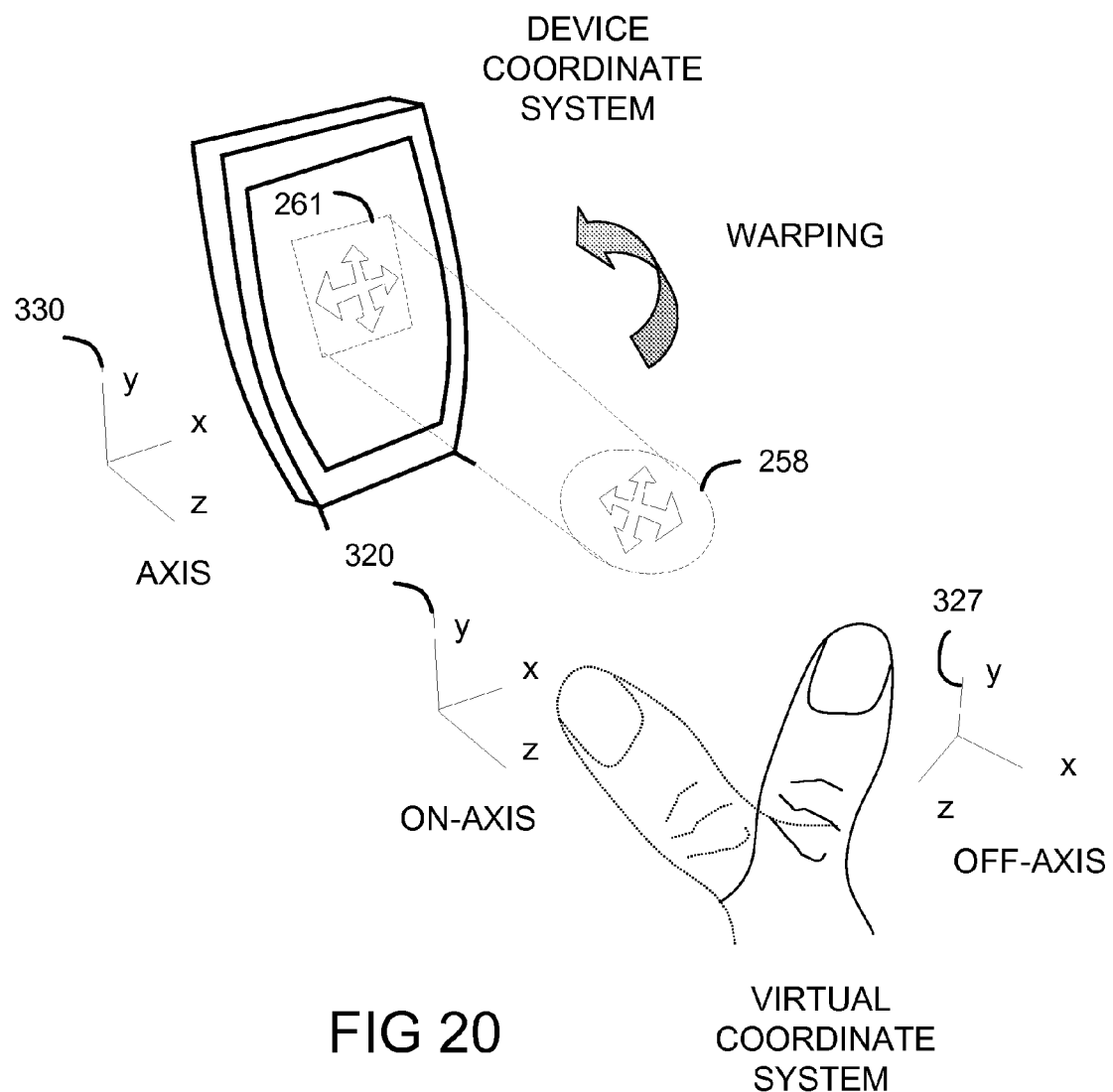
FIG. 20 is an illustration for warping a coordinate system in accordance with an embodiment of the inventive arrangements.

At step 342, an elliptical area can be translated to an elliptical projection. For example, referring to FIG. 20, the circumferential boundary 258 of finger movement can be translated through an affine transformation. The translation accounts for a difference in alignment between the virtual coordinate system 320 principal axes (X,Y,Z). and the device coordinate system 330 principal axes (X,Y,Z). For instance, if the thumb is positioned radially towards the display 120, the principal axes of the virtual coordinate system 320 will align with the principal axes of the device coordinate system 330, and thus be on-axis. In this arrangement, no translation is necessary. However, if the position of the hand is such that the thumb is not radially aligned with the display 120, the principal axes 327 will be off-axis with the principal axes of the virtual coordinate system 330. Accordingly, a translation is necessary to first align the principal axes of the virtual coordinate system 320 and device coordinate system 330 prior to mapping.

At step 344, the elliptical projection can be mapped onto a rectangular area. For example, referring to FIG. 20, upon translation of the elliptical area 258 to an elliptical projection, the elliptical projection can be mapped to the rectangular area 261 which is associated with the display boundary of the mobile device. In practice, the entire range of finger movement is mapped to the entire display range such that the bounds of finger movement in the virtual coordinate system correspond to the bounds of control in the device coordinate system. A visual indicator can be presented upon completion of the warping, which may coincide with completion of the mapping. At step 351, the method 310 can end.

Upon completion of calibration, the user can be granted touchless control. For example, referring back to the method 200 in FIG. 2 for operating the mobile device, as noted, the user can hold down a button to start calibration. Upon completion of calibration, the user can be granted touchless control. That is, the user can immediately start touchless control of the mobile device without having to hit the button again. This also allows the user to gain touchless control of the mobile device directly after calibration for testing the touchless control ability of the mobile device.

Figure 21:
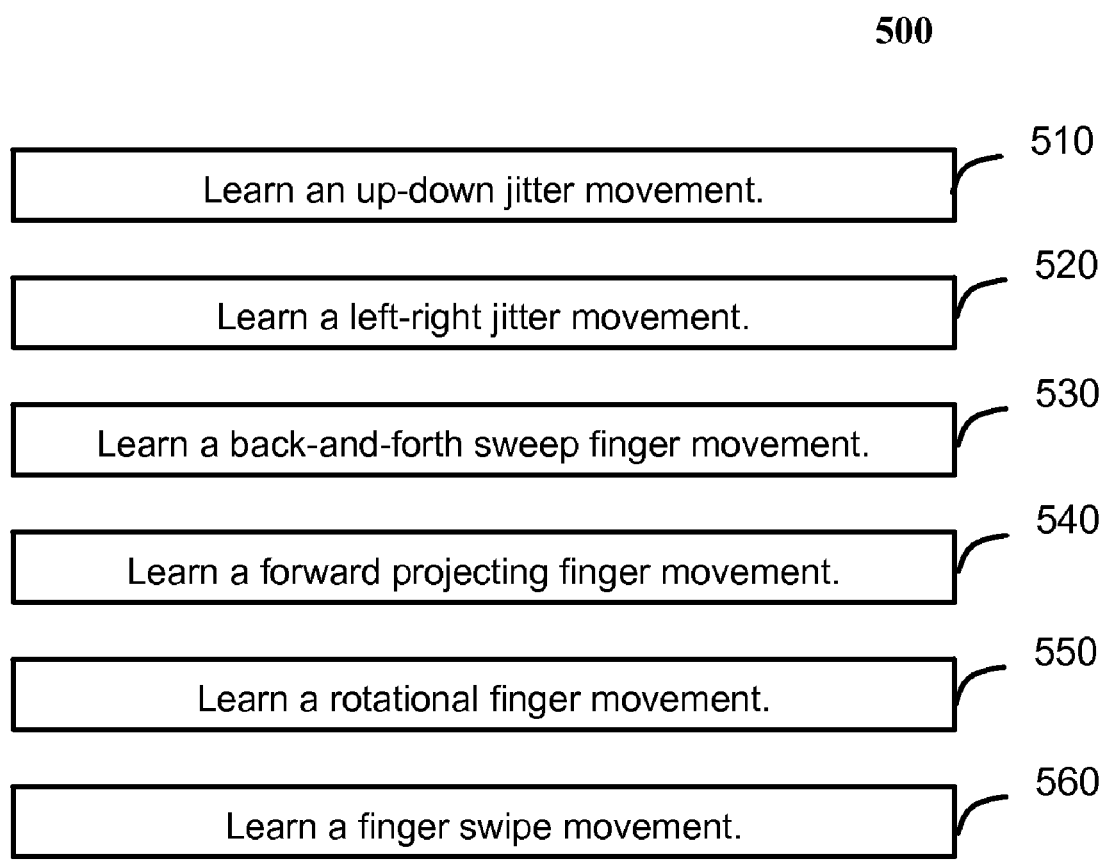
FIG. 21 is a method for calibrating touchless finger movement commands in accordance with an embodiment of the inventive arrangements.

Referring to FIG. 21, a presentation of method blocks 500 for learning touchless commands is shown. The method blocks 500 can be practiced with more or less than the number of steps shown. Moreover, the method blocks 500 are not limited to the order in which the steps are listed. In addition, the method blocks 500 can contain a greater or a fewer number of steps than those shown in FIG. 21.

Briefly, the method blocks 500 demonstrating a plurality of finger movements to a user, which the user performs for the mobile device. The mobile device can learn the subtleties of the finger movements and associate the finger movements with controls available to the mobile device. Specifically, the mobile device evaluates the finger movements and learns behaviors associated with the finger movements. For example, the mobile device may demonstrate a finger sweep movement from left to right. Upon the user performing the finger sweep movement, the mobile device can learn the boundaries, the variance, or the location, of the finger movement for associating with the left to right sweep. The touchless sensing unit 110 can employ a pattern recognition system such as a hidden markov model or a neural net to perform pattern associations as is known in the art.

In practice, the method blocks 500 can begin in any order after a calibration of the mobile device for touchless sensing has been completed. Understandably, calibration tunes the mobile device for touchless control. Accordingly, the touchless sensing unit can learn touchless commands after calibration.

Figure 22:
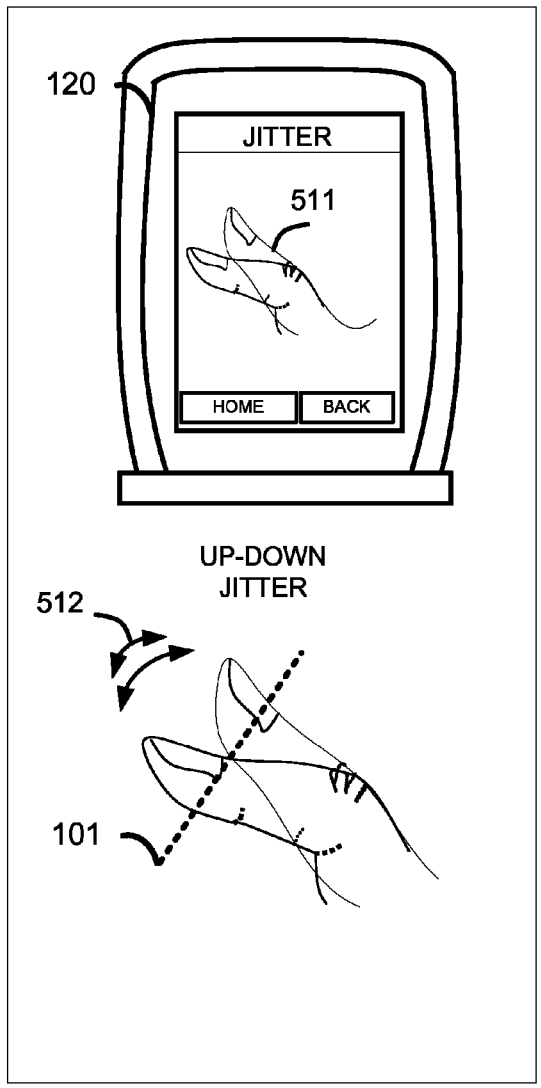
FIG. 22 is a tutorial display for learning up-down jitter finger movement in accordance with an embodiment of the inventive arrangements.

At block 510, the touchless sensing unit 110 (See FIG. 1) can learn an up-down jitter movement. For example, briefly referring to FIG. 22, an illustration for teaching a up-down jitter movement is shown. For example, an image or video clip 511 of a up-down jitter movement can be presented on the display 120 for informing the user of the expected finger behavior. The user can visualize the illustration and perform the finger movement 512 presented in the display 120. The touchless sensing unit 110 (See FIG. 3) can learn the up-down jitter movement and store pattern data associated with the movement for later recognition purposes.

Figure 23:
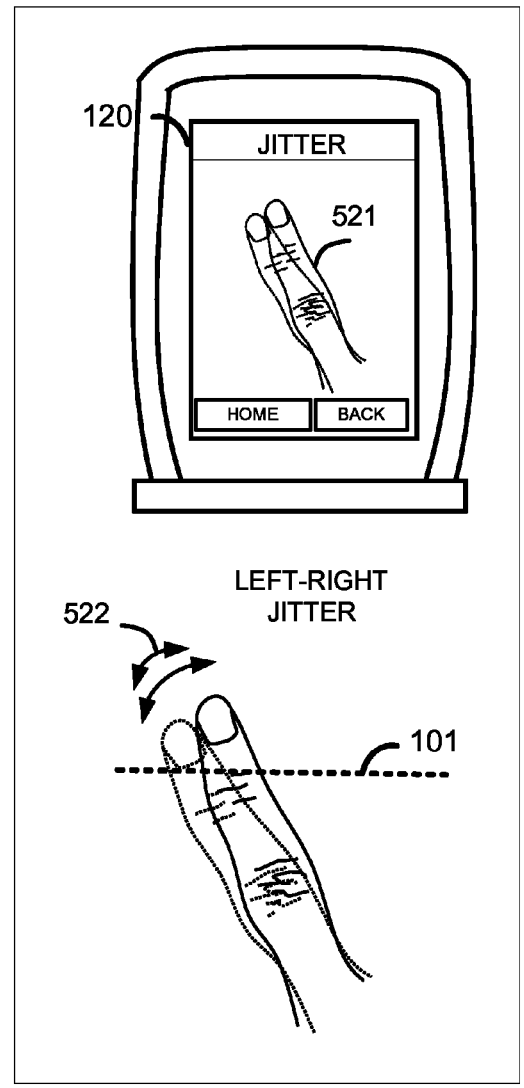
FIG. 23 is a tutorial display for learning an left-right jitter finger movement in accordance with an embodiment of the inventive arrangements.

At block 520, the touchless sensing unit 110 (See FIG. 1) can learn an left-right jitter movement. For example, briefly referring to FIG. 23, an illustration for teaching a left-right jitter movement is shown. For example, an image or video clip 521 of a left-right jitter movement can be presented on the display 120 for informing the user of the expected finger behavior. The user can visualize the illustration and perform the finger movement 522 presented in the display 120. The touchless sensing unit 110 (See FIG. 3) can learn the left-right jitter movement and store pattern data associated with the movement for later recognition purposes.

Figure 24:
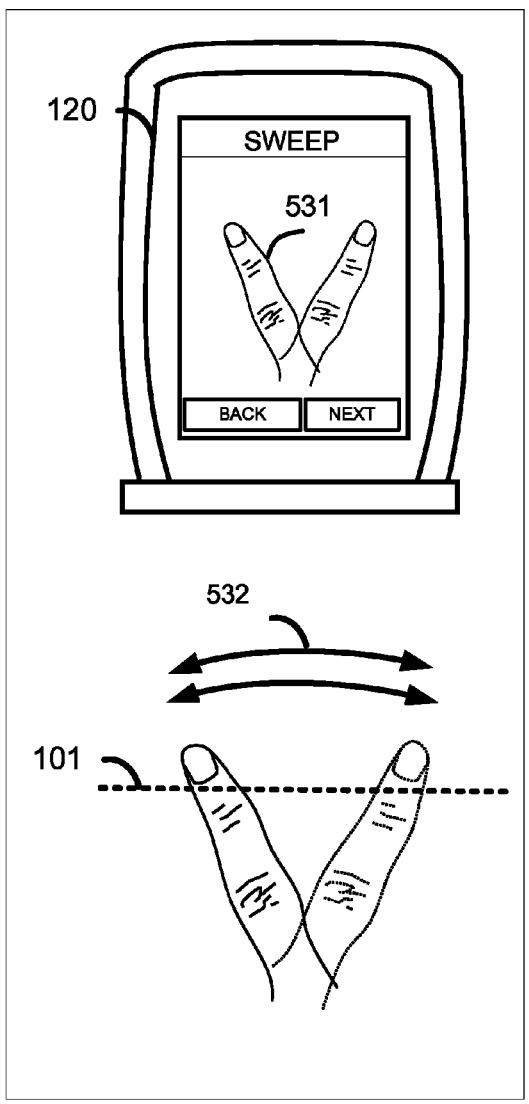
FIG. 24 is a tutorial display for learning a back-and-forth sweep finger movement in accordance with an embodiment of the inventive arrangements.

At block 530, the touchless sensing unit 110 (See FIG. 1) can learn a back-and-forth finger movement. For example, briefly referring to FIG. 24, an illustration for teaching a back-and-forth finger movement is shown. For example, an image or video clip 531 of a back-and-forth finger movement can be presented on the display 120 for informing the user of the expected finger behavior. The user can visualize the illustration and perform the finger movement 532 presented in the display 120. The touchless sensing unit 110 (See FIG. 3) can learn the back-and-forth finger movement and store pattern data associated with the movement for later recognition purposes.

Figure 25:
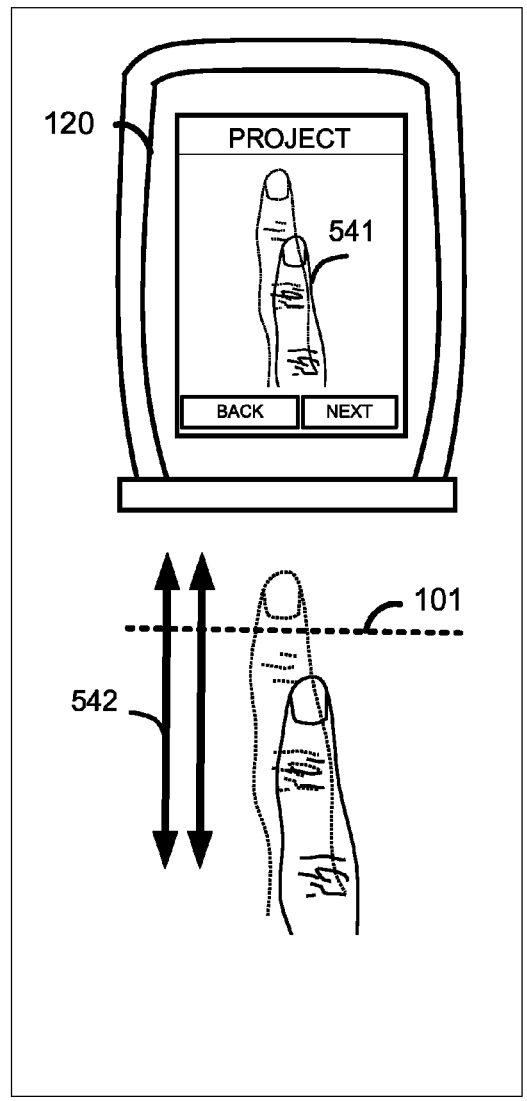
FIG. 25 is a tutorial display for learning a projecting and retracting finger movement in accordance with an embodiment of the inventive arrangements.

At block 540, the touchless sensing unit 110 (See FIG. 1) can learn a forward projecting finger movement. For example, briefly referring to FIG. 25, an illustration for teaching a back-and-forth finger movement is shown. For example, an image or video clip 541 of a forward projecting finger movement can be presented on the display 120 for informing the user of the expected finger behavior. The user can visualize the illustration and perform the finger movement 542 presented in the display 120. The touchless sensing unit 110 (See FIG. 3) can learn the forward projecting movement and store pattern data associated with the movement for later recognition purposes.

Figure 26:
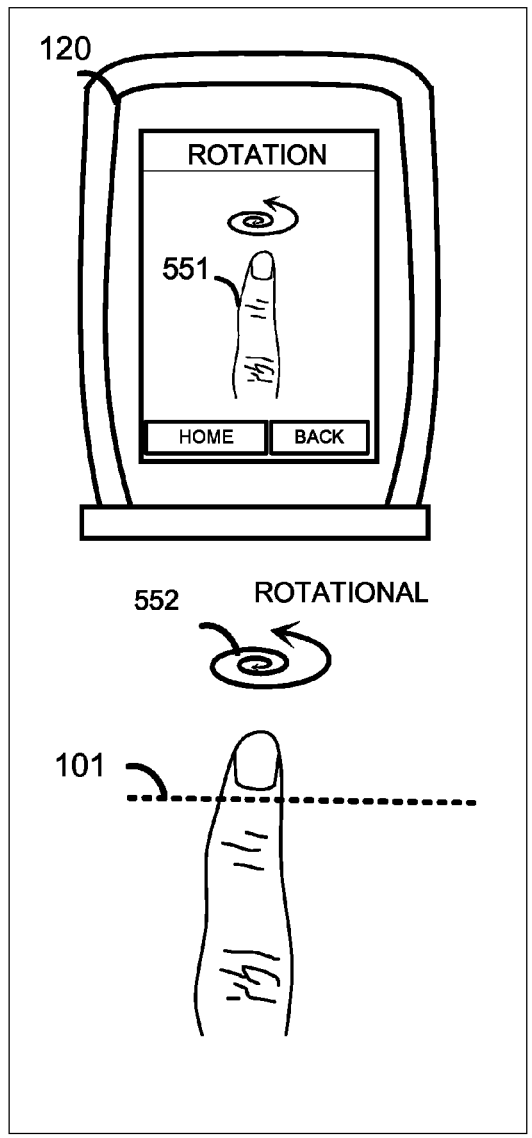
FIG. 26 is a tutorial display for learning a rotational finger movement in accordance with an embodiment of the inventive arrangements.

At block 550, the touchless sensing unit 110 (See FIG. 1) can learn a rotational finger movement. For example, briefly referring to FIG. 26, an illustration for teaching a rotational finger movement is shown. For example, an image or video clip 551 of a rotational finger movement can be presented on the display 120 for informing the user of the expected finger behavior. The user can visualize the illustration and perform the finger movement 552 presented in the display 120. The touchless sensing unit 110 (See FIG. 3) can learn the rotational movement and store pattern data associated with the movement for later recognition purposes.

Figure 27:
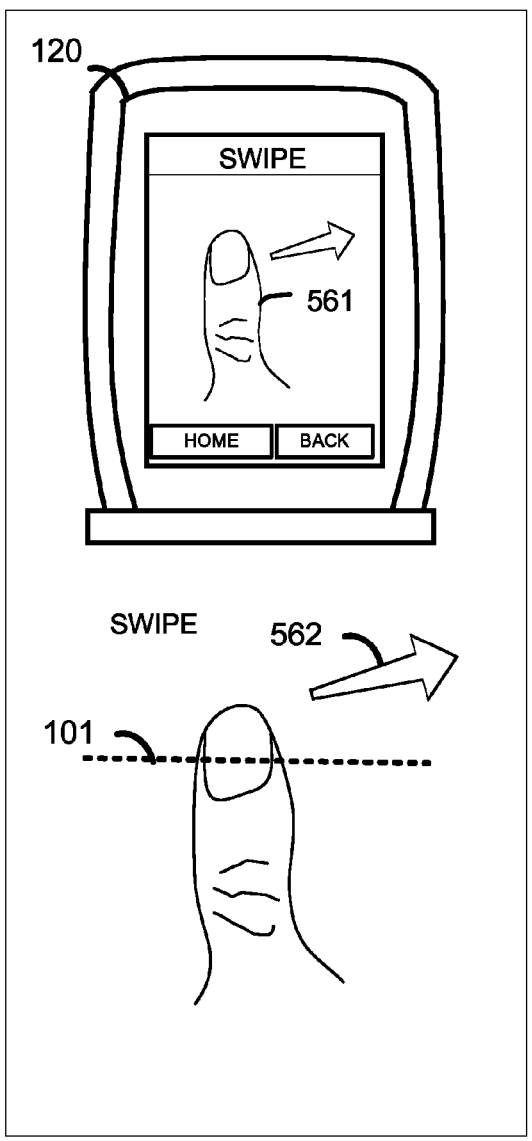
FIG. 27 is a tutorial display for learning a finger swipe movement in accordance with an embodiment of the inventive arrangements.

At block 560, the touchless sensing unit 110 (See FIG. 1) can learn a finger swipe movement. For example, briefly referring to FIG. 27, an illustration for teaching a rotational finger movement is shown. For example, an image or video clip 561 of a finger swipe finger movement can be presented on the display 120 for informing the user of the expected finger behavior. The user can visualize the illustration and perform the finger movement 562 presented in the display 120. The touchless sensing unit 110 (See FIG. 3) can learn the finger swipe movement and store pattern data associated with the movement for later recognition purposes.

Upon learning the touchless finger movement, the touchless sensing unit can associate the finger movements with a command. For example, an up-down finger movement can be associated with an acquire command, a left-right finger movement can be associated with a select command, a rotational finger movement can be associated with a scroll command, a finger swipe movement can be associated with an enter command. Notably, the commands can be interchangeable and defined by the user.

Embodiments of the invention are also directed to a touchless sensing unit for calibrating a device. The touchless sensing unit can include a plurality of sensors for evaluating at least one finger movement within a touchless sensory field, and associating the at least one finger movement with at least one control of the mobile device for calibrating a touchless control of the mobile device. The calibration unit can include a processor to estimate a virtual coordinate system from a range of finger movement, and map the virtual coordinate system to a device coordinate system. The mapping maps at least one location of the finger in the touchless sensory space to at least one location in a device coordinate system. In one arrangement, but not so limited, the plurality of sensors can project an approximately planar sensory field in a direction that is approximately perpendicular to the display of the mobile device.

Figure 28:
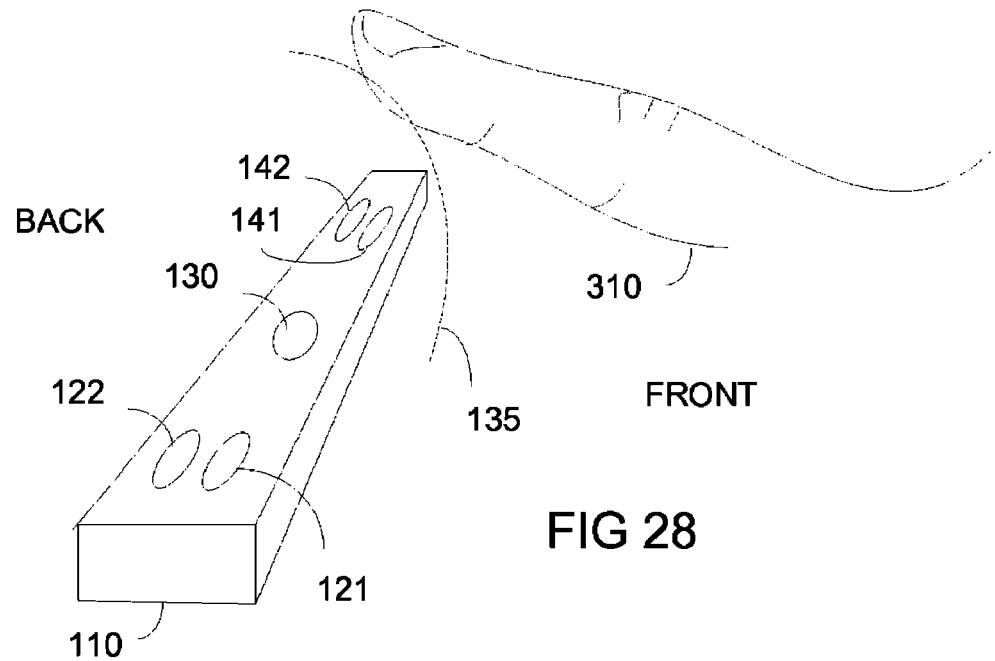
FIG. 28 illustrates the touchless sensing unit in accordance with an embodiment of the inventive arrangements.

Referring to FIG. 28, one embodiment of the touchless sensing unit is shown. The touchless sensing unit 110 can employ a paired receiver arrangement. A first pair of receivers (121 and 122) are positioned on a left of the sensing unit 110. A second pair of receivers (141 and 142) can be positioned on a right side of the sensing unit 110 to narrow the touchless sensory field. The paired receiver arrangement is not limited to a left and right or dually paired arrangement. Notably, the receivers are small enough such that the sensing unit 110 is still relatively slender. For example, the receivers can be MEMS sensors on the order of 1 mm width, length, and height, although other sensing arrangements such as surface acoustic wave, capacitive based, infrared, optical, or dispersive signal processing topologies are contemplated. The receivers in a pair can be close enough for measuring a phase difference between an echo return captured at both receivers. A difference in time of flight measurements can be evaluated to determine if the time of flights are within a predetermined range. For example, a processor within the touchless sensing unit can perform the computations. In the exemplary embodiment, the first pair of receivers (121-122), the transmitter 130, and the second pair of receivers (141-142) are configured in an in-line orientation. That is, they are approximately along a straight line. The in-line paired design of the sensing unit 110 allows for the sensing unit 110 to be placed in-line.

The paired receivers are not restricted to the embodiment shown in FIG. 5. The paired receivers can also be split apart and placed at other locations on the mobile device, for providing a third dimension, if desired. Notably, the sensing unit 110 can contain multiple sensing elements positioned and arranged in various configurations for receiving range measurements in varying directions for calculating the position and movement of the object causing the reflection using multi-path signal processing techniques. The paired transmit and receive elements can be on a same principal axis or a different principal axis.

Figure 29:
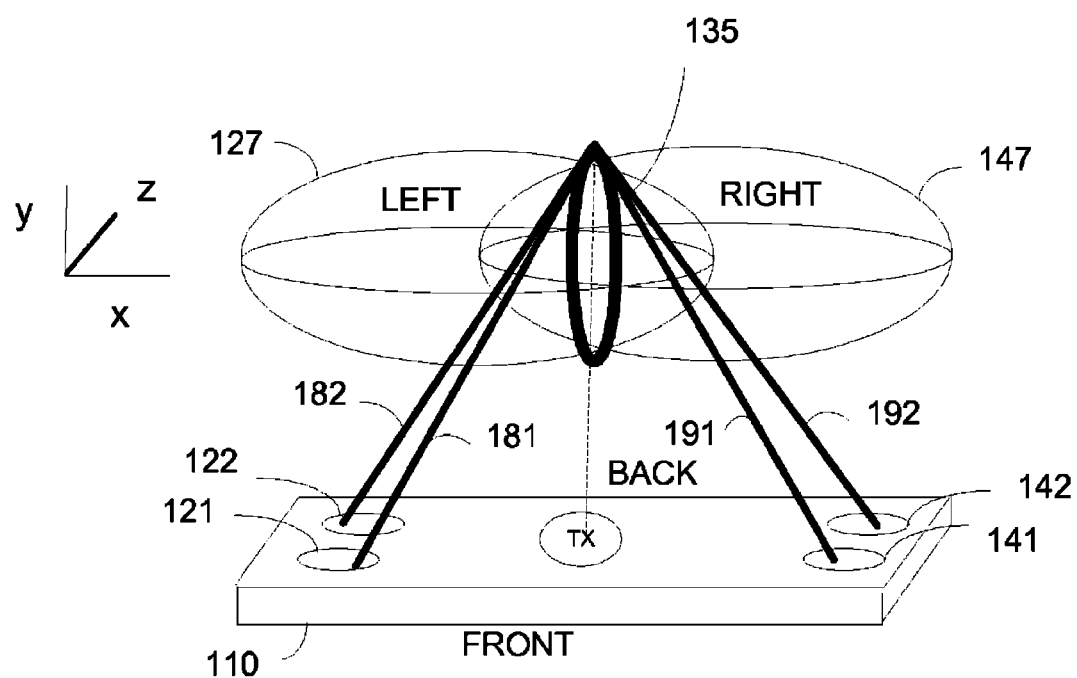
FIG. 29 illustrates a diagram of the touchless sensing unit showing a paired receiver orientation in accordance with an embodiment of the inventive arrangements.

Referring to FIG. 29, a diagram of the sensing unit 110 showing the paired receiver orientation is presented. In particular, a reference volumetric surface 127 and the corresponding time of flights (TOFs) 181 and 182 are shown. Similarly, a reference volumetric surface 147 and the corresponding time of flights (TOFs) 191 and 192 are shown. Due to the front and back arrangement of the paired receivers, when the object 310 is directly above the sensing unit 110, TOF 181=TOF 182, and TOF 191=TOF 192. When the object is forward of center, TOF 181<TOF 182, and TOF 191<192.

When the object is back of center 181>TOF 182, and TOF 191>192. Notably, the front and back orientation of the receivers allows for a determination of when the object is centered above the sensing unit 110 based on TOF measurements. Accordingly, a difference between TOFs can be evaluated to determine when the TOFs are approximately equal. More specifically, a phase angle can be measured between two echo returns captured at a pair of receivers for determining a centering of the object. Due to the symmetrical arrangement, a virtual screen can be created. For example, as long as the object is centered above the sensing unit 110, the first TOF and second TOF for each pair of receivers will be approximately equal. When the object is forward or backward of center, the TOFs measured at both receivers will not be equal. The virtual screen can be generated when a phase angle corresponds to an approximately centered location.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A method for calibrating touchless sensory controls of a mobile device, comprising:
   detecting a first button press;
   determining if the first button press is held down within a time duration; and
   if so, granting touchless control of the mobile device if the button press is held down within the time duration,
   else, starting a range calibration of the mobile device for touchless control if the button press is held down longer than the time duration,
   wherein the range calibration comprises:
   tracking a first full radial range of touchless finger tip movement corresponding to a left-right radial finger tip track within a virtual coordinate system of a touchless sensory field with respect to a stationary origin of the finger tip movement during the first full radial range;
   aligning the first full radial range corresponding to a left-right radial finger tip track with a X principal axis of the virtual coordinate system;
   tracking a second full radial range of touchless finger tip movement corresponding to an up-down radial finger tip track within the virtual coordinate system of the touchless sensory field with respect to the stationary origin of the finger tip movement during the second full radial range;
   aligning the second full radial range of the up-down radial finger tip track with a Y principal axis of the virtual coordinate system;
   mapping both the X principal and Y principal axes of the virtual coordinate system to principal axes of a device coordinate system of a display of the mobile device,
   wherein the range calibration establishes how a user's hand or finger is oriented with respect to its stationary origin relative to a touchless sensing unit producing the touchless sensing field and maps the principal axes to the display according to the orientated hand or finger,
   wherein one or more range calibrations of differing hand orientations at differing origin locations permit respective alignment of the same X and Y principal axes with the device coordinate system to support different touchless user interface control mappings.

2. The method of claim 1, further comprising:
   detecting a second button press; and
   disabling touchless control of the mobile device in response to the second button press.

3. The method of claim 1, wherein initiating the calibration, further comprises:
   presenting a first indicator that calibration is starting;
   evaluating the first and second full radial range of finger tip movement within the touchless sensory field;
   mapping the first and second full radial range of finger tip movements to a display range; and
   presenting a second indicator when the mapping is complete,
   wherein the mapping maps at least one location of the finger in the touchless sensory field to at least one location in the display range to assign a virtual coordinate system to the touchless sensory field.

4. The method of claim 3, wherein presenting an indicator includes displaying a visual indicator or audibly playing a sound.

5. The method of claim 1, wherein mapping the range further comprises:
   estimating an elliptical trajectory of the virtual coordinate system from a full rotational range of finger movement;
   determining and visually presenting an origin of the virtual coordinate system by finding the stationary origin of the finger with respect to a circumferential boundary of the finger movement along the elliptical trajectory in a display range associated with a device coordinate system;
   identifying the stationary origin of the finger in the virtual coordinate system from a center of the circumferential boundary;
   determining a difference between the stationary origin of the finger in the virtual coordinate system and a display origin in the device coordinate system; and
   warping the virtual coordinate system to the device coordinate system based on the difference.

6. The method of claim 5, wherein the warping includes:
   translating the circumferential boundary along the elliptical trajectory through an affine transformation; and
   non-linearly mapping the elliptical trajectory onto a rectangular area, wherein the mapping accounts for the movement of the finger along the elliptical trajectory and the first and second full radial range of finger movement along the principal axes of the virtual coordinate system with respect to a principal axes of the device coordinate system such that finger tip locations within a full radial range of finger tip movement within the elliptical trajectory correspond to a unique point location within a rectangle of the display.

7. The method of claim 5, further comprising:
presenting a third indicator when the warping is complete; and
granting touchless control of the mobile device, wherein the touchless control uses the virtual coordinate system to adjust at least one control in a device coordinate system in response to a finger movement.

8. A method for calibrating a mobile device for touchless control, comprising:
evaluating two full range finger movements within a touchless sensory space each maximally wide across a full radial range of finger motion; and
associating first and second finger movements with at least one calibration range of touchless control for the mobile device,
wherein the associating calibrates the touchless control with the at least one finger movement,
where the calibrating includes
tracking a first full radial range of touchless finger tip movement corresponding to a left-right radial finger tip track within a virtual coordinate system of the touchless sensory field with respect to a stationary origin of the finger tip movement during the first full radial range;
aligning the first full radial range corresponding to a left-right radial finger tip track with a X principal axis of the virtual coordinate system;
tracking a second full radial range of touchless finger tip movement corresponding to an up-down radial finger tip track within the virtual coordinate system of the touchless sensory field with respect to the stationary origin of the finger tip movement during the second full radial range;
aligning the second full radial range of the up-down radial finger tip track with a Y principal axis of the virtual coordinate system;
mapping both the X principal and Y principal axes of the virtual coordinate system to a device coordinate system of a display of the mobile device,
wherein the range calibration establishes how a user's hand or finger movement is oriented with respect to its origin location relative to a touchless sensing unit producing the touchless sensing field and the mapping of the principal axes to the display,
wherein one or more range calibrations of differing hand orientations at differing origin locations permit respective alignment of the same X and Y principal axes to support different touchless user interface control mappings.

9. The method of claim 8, wherein the associating first and second finger movement further comprises:
estimating a virtual coordinate system from the two full range finger movements; and
mapping the virtual coordinate system to a device coordinate system;
wherein the mapping maps at least one location of the finger in the touchless sensory field to at least one location in a device coordinate system.

10. The method of claim 9, further comprising at least one of:
estimating the left-right full range of radial finger movement for identifying an X range along the X principal axis;
estimating the up-down full range of radial finger movement for identifying a Y range along the Y principal axis;
estimating a forward-back range of finger movement for identifying a Z range along a Z principal axis; and
estimating a rotational range of finger movement for identifying the circumferential range.

11. The method of claim 8, further comprising at least one of:
presenting a first indicator when the calibrating is starting;
presenting a second indicator when the associating is complete; or presenting a third indicator when the calibrating is complete.

12. The method of claim 8, further comprising at least one of:
presenting an image for teaching the at least one finger movement; or presenting a video clip for teaching the at least one finger movement.

13. The method of claim 8, wherein the associating the at least one finger movement includes at least one of:
learning an up-down jitter movement;
learning a left-right jitter movement;
learning a back-and-forth sweep finger movement;
learning a forward projecting finger movement;
learning a rotational finger movement; or
learning a finger swipe movement.

14. The method of claim 8, further comprising:
identifying a location of the finger movement; and
associating the location with a control on a display of the mobile device, wherein a variance of the finger movement at the location is associated with a calibration of the control.

15. The method of claim 14, wherein the associating a location includes mapping a three-dimensional finger movement to a control command.

16. The method of claim 14, wherein the associating a location includes mapping a two-dimensional finger movement to a control command.

17. A touchless unit communicatively coupled to a mobile device, comprising:
a plurality of sensors for:
evaluating two full range finger movements within a touchless sensory field each maximally across a full radial range of finger motion; and
associating the two full range finger movements with at least one control of the mobile device for calibrating a touchless control of the mobile device, by
ultrasonic tracking a first and second full radial range of touchless finger tip movement within a virtual coordinate system of the touchless sensory field with respect to a stationary origin of the finger tip movement during the first and second full radial range;
respectively aligning the first full radial range and second full radial range with a X and Y principal axis of the virtual coordinate system;
estimating an elliptical trajectory of the virtual coordinate system from a full rotational range of finger movement with respect to the stationary origin;
translating a circumferential boundary of the elliptical trajectory through an affine transformation to determine the stationary origin;
mapping the X principal and Y principal axes of the virtual coordinate system to a device coordinate system of a display of the mobile device according to the stationary origin and respective first and second full radial range of finger movement along the X and Y principal axes, wherein the calibrating establishes how a user's hand or finger movement is oriented with respect to its stationary origin relative to a touchless sensing unit producing the touchless sensory field and the mapping of the virtual coordinate system to the device coordinate system.

18. The touchless unit of claim 17, further comprising a processor that:
- tracks a location and full range movement of the finger based on pulse-echo detection;
- measures between two echo returns a phase angle for determining a centering of the stationary origin;
- estimates a virtual coordinate system from the first and second full radial range of finger movement with an coordinate system origin corresponding to the stationary origin of the finger; and
- non-linearly maps the virtual coordinate system to a device coordinate system, wherein the mapping maps at least one location of the finger in the touchless sensory field to at least one location in a device coordinate system.

* * * * *